(12) United States Patent
Yao et al.

(10) Patent No.: US 8,464,060 B2
(45) Date of Patent: Jun. 11, 2013

(54) METHOD AND STRUCTURE FOR SELF-SEALED JOINT PROOF-OF-KNOWLEDGE AND DIFFIE-HELLMAN KEY-EXCHANGE PROTOCOLS

(75) Inventors: Andrew C. Yao, Beijing (CN); Yunlei Zhao, Shanghai (CN)

(73) Assignee: Andrew C. Yao, Beijing (CN)

( * ) Notice: Subject to any disclaimer, the term of this patent is extended or adjusted under 35 U.S.C. 154(b) by 364 days.

(21) Appl. No.: 12/766,431

(22) Filed: Apr. 23, 2010

(65) Prior Publication Data

US 2010/0205443 A1 Aug. 12, 2010

Related U.S. Application Data

(63) Continuation of application No. PCT/CN2008/072794, filed on Oct. 23, 2008.

(30) Foreign Application Priority Data

| Oct. 23, 2007 | (CN) | 2007 1 0047344 |
| Jan. 10, 2008 | (CN) | 2008 1 0032507 |
| Jan. 10, 2008 | (CN) | 2008 1 0032508 |
| Jan. 17, 2008 | (CN) | 2008 1 0032772 |
| Jul. 8, 2008 | (CN) | 2008 1 0040311 |
| Aug. 7, 2008 | (CN) | 2008 1 0041475 |

(51) Int. Cl.
*H04L 29/06* (2006.01)

(52) U.S. Cl.
USPC .......................................... 713/171; 380/255

(58) Field of Classification Search
USPC ........................................................ 713/171
See application file for complete search history.

(56) References Cited

U.S. PATENT DOCUMENTS

| 5,953,420 A * | 9/1999 | Matyas et al. ................. 713/171 |
| 5,966,445 A * | 10/1999 | Park et al. ..................... 713/180 |
| 2006/0093138 A1 * | 5/2006 | Durand et al. .................. 380/44 |

FOREIGN PATENT DOCUMENTS

| CN | 1761186 | 4/2006 |
| CN | 101175076 | 5/2008 |
| CN | 101217549 | 7/2008 |
| CN | 101247224 | 8/2008 |
| CN | 101247394 | 8/2008 |
| WO | 2006/048043 | 5/2006 |

OTHER PUBLICATIONS

International Search Report for PCT/CN2008/072794, dated Feb. 5, 2009.

* cited by examiner

*Primary Examiner* — Edward Zee
*Assistant Examiner* — Yogesh Paliwal
(74) *Attorney, Agent, or Firm* — Hamre, Schumann, Mueller & Larson, P.C.

(57) ABSTRACT

A method (and structure) for a party (the prover) to prove its knowledge, jointly and non-malleably, of multiple secret (fixed and/or ephemeral) Diffie-Hellman exponents (DH-exponents), corresponding to its public (fixed and/or ephemeral) DH-components and with respect to the public (fixed and/or ephemeral) challenging DH-components from another party (the verifier). The joint proof-of-knowledge (JPOK) consists of secrets made by multiplying multiple DH-secrets, which can be generated and verified by each party by its own secret DH-exponents and the public DH-components of both parties. To ensure the non-malleability of the JPOK, the method makes all these multiplied DH-secrets to be independent, and makes the session-tag committed to the multiplied DH-secrets. In addition, the invented method makes the DH-secrets to be multiplied to further satisfy at least one of the following: (1) deniability; (2) pre-computability; and (3) post-ID computability.

17 Claims, 8 Drawing Sheets

400

$$X = g^x$$

$\hat{A}$ ⟶ $\hat{B}$  $PK_{\hat{B}} : B = g^b$
$SK_{\hat{B}} : b$ $$m, Y = g^y, \sigma = Y^{b+h(Y,m)y}$$ ⟵ 401

Verifies
$$\sigma = (YB^{h(Y,m)})^x$$ 402

- $\hat{B}$ computes $K'_{\hat{B}} = H_K(X^{bd+ye})$, $K_m = H_K(K'_{\hat{B}}, A^{yc}, 0)$, $K = H_K(K'_{\hat{B}}, A^{yc}, 1)$, where $c, d, e$ are computed as in YYZ

- $\hat{A}$ can pre-compute $B^{xd}$, computes $Y^{ac}$ and $Y^{xe}$ in parallel, sets $K'_{\hat{A}} = H_K(B^{xd}Y^{xe})$, $K_m = H_K(K'_{\hat{A}}, Y^{ac}, 0)$, $K = H_K(K'_{\hat{A}}, Y^{ac}, 1)$

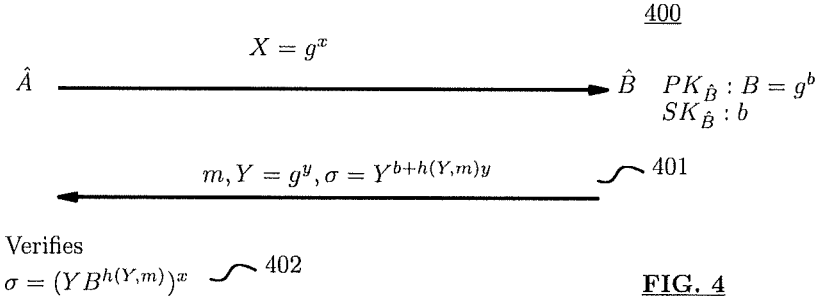

FIG. 4

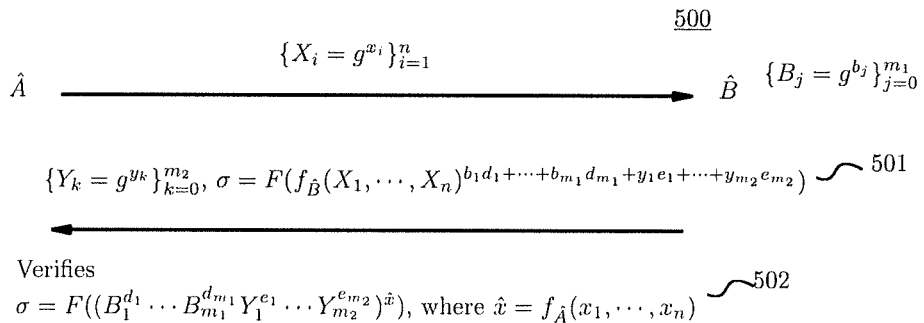

The non-zero functions $d_1, \cdots, d_{m_1}, e_1, \cdots, e_{m_2}$ (some of them may be zero) satisfy: 503

1. The values $b_1 d_1, \cdots, b_{m_1} d_{m_1}, y_1 e_1, \cdots, y_{m_2} e_{m_2}$ are independent against malicious $\hat{B}$ (or, the values $\hat{x} b_1 d_1, \cdots, \hat{x} b_{m_1} d_{m_1}, \hat{x} y_1 e_1, \cdots, \hat{x} y_{m_2} e_{m_2}$ are independent against malicious $\hat{A}$ or $\hat{B}$) 504

2. $\sigma$ (actually, the input of $F$) is tag-binding self-sealed, or it at least commits to the (possibly partial) session-tag known to $\hat{B}$ at the point of computing $\sigma$ 3. $B_1^{\hat{x} d_1}, \cdots, B_{m_1}^{\hat{x} d_{m_1}}$ can be pre-computed by $\hat{A}$ offline 505

FIG. 5

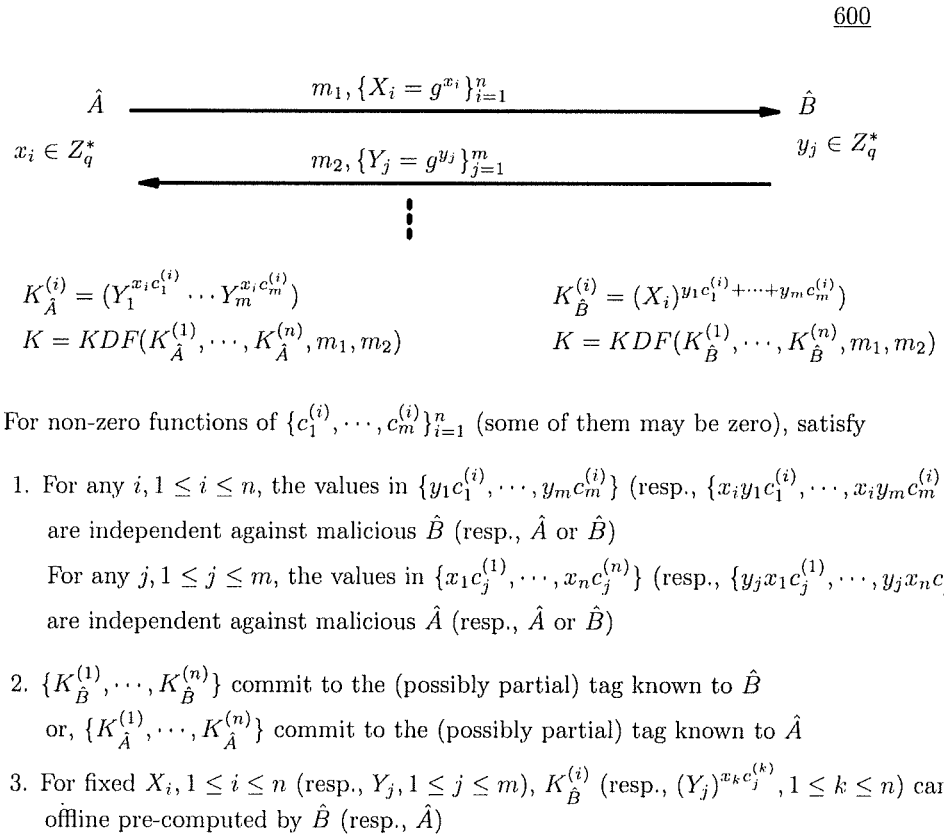

For non-zero functions of $\{c_1^{(i)}, \cdots, c_m^{(i)}\}_{i=1}^n$ (some of them may be zero), satisfy 1. For any $i, 1 \leq i \leq n$, the values in $\{y_1 c_1^{(i)}, \cdots, y_m c_m^{(i)}\}$ (resp., $\{x_i y_1 c_1^{(i)}, \cdots, x_i y_m c_m^{(i)}\}$) are independent against malicious $\hat{B}$ (resp., $\hat{A}$ or $\hat{B}$)

For any $j, 1 \leq j \leq m$, the values in $\{x_1 c_j^{(1)}, \cdots, x_n c_j^{(n)}\}$ (resp., $\{y_j x_1 c_j^{(1)}, \cdots, y_j x_n c_j^{(n)}\}$) are independent against malicious $\hat{A}$ (resp., $\hat{A}$ or $\hat{B}$)

2. $\{K_{\hat{B}}^{(1)}, \cdots, K_{\hat{B}}^{(n)}\}$ commit to the (possibly partial) tag known to $\hat{B}$ or, $\{K_{\hat{A}}^{(1)}, \cdots, K_{\hat{A}}^{(n)}\}$ commit to the (possibly partial) tag known to $\hat{A}$ 3. For fixed $X_i, 1 \leq i \leq n$ (resp., $Y_j, 1 \leq j \leq m$), $K_{\hat{B}}^{(i)}$ (resp., $(Y_j)^{x_k c_j^{(k)}}, 1 \leq k \leq n$) can be offline pre-computed by $\hat{B}$ (resp., $\hat{A}$)

FIG. 6

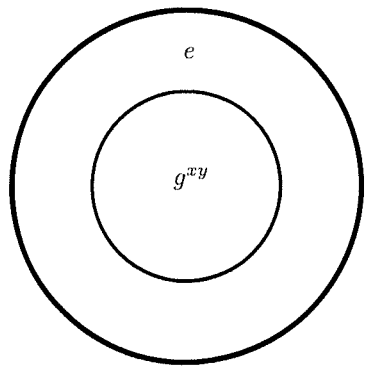
1301: TBSS-DH
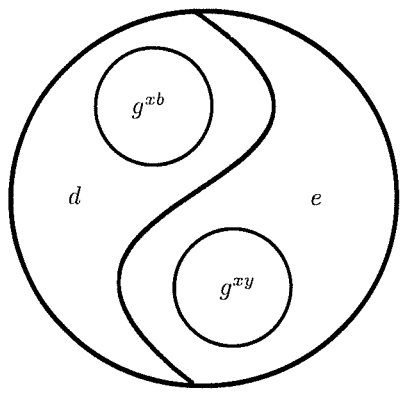
1302: SSJPOK
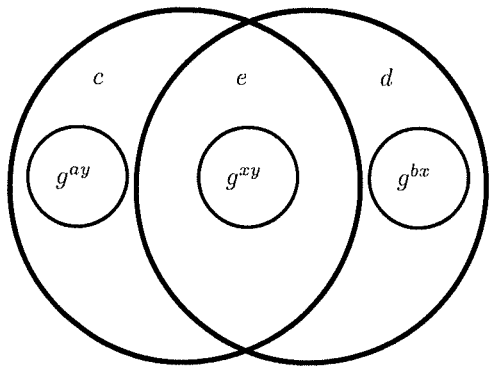
1303: YYZ
FIG. 13

METHOD AND STRUCTURE FOR SELF-SEALED JOINT PROOF-OF-KNOWLEDGE AND DIFFIE-HELLMAN KEY-EXCHANGE PROTOCOLS

BACKGROUND OF THE INVENTION

1. Technical Field

Aspects of the present invention generally relate to proof-of-knowledge (POK), which allows a prover to convince a verifier of its knowledge of the multiple secret DH-exponents, corresponding to some public (fixed and/or ephemeral) DH-components, while revealing no knowledge of the supposed secrets. The POK is aimed for concurrent non-malleability security, robust secrecy exposure resistance, privacy preserving and on-line efficiency. By viewing fixed DH-components as public-keys and each party proving its knowledge of secret DH-exponents using the invented POK method, in exemplary embodiments, this particularly yields authenticated Diffie-Hellman key-exchange (DHKE) protocols.

2. Description of the Related Art

The Diffie-Hellman key-exchange (DHKE) protocol 101, illustrated in FIG. 1, is at the root of public-key cryptography (PKC), and is one of the main pillars of both theory and practice of cryptography. Generally, key exchange plays a central role in modern cryptography, in the sense that it serves as the bridge between public-key cryptography and secret-key cryptography (SKC). Specifically, PKC is convenient for use but inefficient, while SKC is efficient but inconvenient for use. In common applied crypto applications, PKC is mainly used to generate and share a secret-key among users, and then SKC comes into force with the shared secret-key. Particularly important to applied crypto engineering, DHKE underlies a wide range of key industrial standards for ensuring network security. Another reason that DHKE is important and popular is that it supports implementations based on elliptic curve cryptography.

Despite its seeming conceptual simplicity, designing correct and secure DHKE protocols turns out to be extremely error prone and can be notoriously subtle (the literature is filled with DHKE protocols that have been found to contain certain security flaws). The reason for this is the high system complexity and enormous number of subtleties surrounding the definition and design/analysis of sound DHKE protocols. Telling apart secure from insecure protocols can hardly be done by immediate inspection or using simple intuition. Therefore, it is of utmost importance to come up with reasonable frameworks/models to understand the underlying rational for sound design choices, to formulate the bare-bone nature of sound DHKE, to allow and guide successful novel implementations, and to provide new insights into both the design and analysis of DHKE (as well as to debug the shortcomings of existing protocols). In general, coming up with reasonable frameworks/models of complex systems is arguably one of the most important as well as hardest parts of research.

A list of models and frameworks for the provable security of DHKE are developed in the literature. Unfortunately, due to the high system complexity and subtle nature of DHKE, all known exiting frameworks and models turn out to be insufficient for capturing some essential security properties of DHKE. Also, some models and frameworks are themselves too complicated to be worked with easily, which may cause complicated and potentially error-prone lengthy proofs (as well as potential misunderstanding or misinterpretation of the actual security guarantee).

Recently, the inventors introduced a new framework for DHKE protocols, which is referred to as the Yao-Yao-Zhao (YYZ) framework. For presentation simplicity, the YYZ framework is briefly recalled here in the two-party setting between two parties $\hat{A}$ and $\hat{B}$, and it is assumed that the party $\hat{A}$ plays the role of the initiator and the party $\hat{B}$ plays the role of the responder. Let G' be a finite Abelian group of order N, G be a subgroup of order q of G', and g is a generator of G, where q is a large prime (typically, |q|=160) and the computational Diffie-Hellman (CDH) assumption holds with respect to G. The inventors use multiplicative notation for the group operation in G', denote by $1_G$ the identity element of G' and by $$t = \frac{N}{q}$$

the cofactor. The protocol run between $\hat{A}$ and $\hat{B}$ is denoted as the protocol $<\hat{A}, \hat{B}>$. Denote by $X=g^x$ and x the ephemeral DH-component and ephemeral DH-exponent of the party $\hat{A}$, and by $Y=g^y$ and y the DH-component and DH-exponent of the party $\hat{B}$, where x and y are taken randomly and independently from $Z_q^*$.

To distinguish concurrent sessions locally running at each player's side, an uncorrupted player identifies each local session at its side by its identity and its DH-component sent in this session, e.g., $(\hat{A},X)$. Each local session is also labeled by a tag, which is the concatenation, in the order of session initiator and then session responder, of (available) players' identities and (whether static public-key and ephemeral) DH-component contributions, e.g., $Tag=(\hat{A},\hat{B},X,Y)$ for a completed (i.e., successfully finished) session of the original DH-protocol. (For the general multi-party case, the tag of each session is set to be the concatenation, in some agreed order, of all players' identities and their DH-component contributions.) For an incomplete or aborted session, its tag is determined by the available partial transcript. Note that one of the players $\hat{A}$ or $\hat{B}$, but not all, in the tag may actually be impersonated or just controlled by an adversary.

For a completed local session $(\hat{A},X)$ (resp., $(\hat{B},Y)$), referred to as the test-session, at the side of the uncorrupted player $\hat{A}$ (resp., $\hat{B}$) with the tag $Tag=(\hat{A},\hat{B},X,Y)$, we define its matching session to be the local session $(\hat{C},Y)$ (resp., $(\hat{C},X)$) run at the side of any uncorrupted player $\hat{C}$, in case that such matching session exists. Once a session is finished, the honest players always erase the ephemeral private states generated during the session, and only keep in privacy the session key output; Sessions can also be expired, and for expired sessions the session keys are also erased.

Polynomially many concurrent executing instances (sessions) of the protocol $<\hat{A},\hat{B}>$ take place in an asynchronous setting (such as the Internet), and all communication channels are assumed to be unauthenticated and controlled by a probabilistic polynomial-time (PPT) concurrent man-in-the-middle (CMIM) adversary Д In addition, Д takes some arbitrary auxiliary input $z\in\{0,1\}^*$, which captures arbitrary information collected/eavesdropped by Д over the network from the executions of arbitrary (possibly different) protocols prior to its interactions with the instances of $\hat{A}$ or $\hat{B}$. The CMIM Д can do whatever it wishes. Besides scheduling exchanging messages at its wish, Д is also allowed to access secret information against any honest player instance, via attacks of four types: (1) Ephemeral private state reveal on an incomplete sessions, by which Д learns the ephemeral private states generated by the honest player during the incomplete session; (2) Session-key reveals on a completed and unexpired session; (3) Static secret-key reveals on an honest player; (4) Player corruptions, by which Д totally controls the corrupted player. A local session run at the side of an honest player is called internally-unexposed, if this player does not suffer from the above exposure attacks (1) and (4) until the session is completed.

Within the mentioned YYZ framework for DHKE protocols, the inventors formulated a new notion of security for DHKE protocols: tag-based robust non-malleability (TBRNM). The philosophy of TBRNM, formulated by the YYZ framework, is to achieve the most robust security guarantee while relying on the minimal secrecy. TBRNM essentially says that an uncorrupted player, who successfully finishes an internally-unexposed session of distinct tag (which is referred to as the test session), should have the guarantee: its peer (whether honest or malicious) must "know" both the according DH-exponent and the secret-key (corresponding to the DH-component and the public-key sent and alleged by its peer in this session). This guarantee holds even if the adversary learns the static secret-key of any uncorrupted player, ephemeral private state information of any other sessions (other than the test-session and possibly its matching session), and the session-key outputs of any completed and unexpired sessions.

For the trade-off between security and privacy, two levels of TBRNM security are formulated within the YYZ framework; (1) Tag-binding TBRNM, which holds as long as only the test-session is internally-unexposed. Tag-binding TBRNM is mainly for protocols where each player knows (and makes sure the validity of) its peer's identity and public-key prior to the protocol run; (2) Privacy-preserving TBRNM, which holds as long as both the test-session and its matching session are internally-unexposed. Privacy-preserving TBRNM is mainly for protocols that may work in the post-ID model (i.e., a party learns its peer's identity or public-key information only during the evolution of the protocol run, and even at the last round of the session).

It is clarified by the inventors that the TBRNM security, together with independent session-keys for sessions of different tags, implies most essential security properties expected for DHKE protocols. Also, the goal of tag-based robust non-malleability would naturally be a fundamental principle for any sound and robust DHKE protocols.

In this application, the inventors re-investigate and analyze DHKE protocols in the mentioned YYZ framework for DHKE. The inventors observe and clarify some fundamental issues that were not previously (at least explicitly) addressed in the literature. These issues are about the subtleties of using the shared DH-secret as a building block (particularly multiplied by other DH-secrets) for building more advanced and complex cryptographic objects.

Among all DHKE protocols based on public-key authentications, the MQV protocol shown in FIG. 2, 201 and 203 (developed by Menezes et al in Second Workshop on Selected Areas in Cryptography SAC '95, pages 22-32, November 1995) and the HMQV protocol shown in FIGS. 2, 201 and 203 (developed by Krawczyk in Advances in Cryptology-Proceedings of CRYPTO 2005, pages 546-566, August 2005) are among the most successful and possibly the most efficient authenticated Diffie-Hellman protocols based on public-key authentication. For presentation simplicity, the MQV and HMQV protocols are referred to as the (H)MQV protocol family. Let Â (resp., B̂) be of public-key $A=g^a$ (resp., $B=g^b$) and secret-key a (resp., b), and $H_K$ be a hash function of k-bit output (where k is the security parameter), the (H)MQV protocol family is recalled in FIG. 2 (201, 202, 203).

(H)MQV has been widely standardized. In particular, it has been announced by the US National Security Agency (NSA) as the key exchange mechanism underlying "the next generation cryptography to protect US government information", which includes the protection of "classified or mission critical national security information".

Despite an arguable evolution history of (H)MQV, it is commonly believed that the updated version of (H)MQV, with security analysis and discussions in the Canetti Krawczyk framework, should be robust enough and should have no other security weaknesses. Particularly in view of the nearly optimal efficiency of (H)MQV, it may be suggested that (H)MQV achieves the best for DHKE in the integrity of security and protocol efficiency.

The inventors re-investigate (H)MQV in accordance with the mentioned YYZ framework for DHKE, and show that (H)MQV fails in achieving tag-based robust non-malleability in general. This is demonstrated by concrete attacks. That is, by malleating messages from other honest parties, an adversary can successfully finish a session of (H)MQV with an honest player, but actually without knowing either the secret-key or the ephemeral DH-exponent alleged and sent by the adversary. This is due to the weakness and vulnerability of the underlying building tool used in (H)MQV for demonstrating the knowledge of secret-key and ephemeral DH-exponent of each player. The inventors then propose some fixing approaches to the weakness identified by the inventors in the YYZ framework.

Besides the security weakness of the (H)MQV protocol, the inventors further note some disadvantages of the (H)MQV protocols: (1) (H)MQV does not allow pre-computation of parts of the shared session-key to improve on-line efficiency; (2) (H)MQV does not support post-ID computability of the shared session-key; (3). (H)MQV does not support parallel computation of parts of shared session-key and explicit subgroup test of peer's ephemeral DH-components; (4) (H)MQV does not guarantee deniability (a very useful property for preserving players' privacy).

The above identified weaknesses and disadvantages of (H)MQV may reflect, despite its appearing success, the underlying design rational and building tools of (H)MQV may not be so sound and robust as commonly expected. This raised concerns to the present inventors to design authenticated DHKE protocols, towards to the optimal tradeoff among security, privacy and protocol efficiency, under fundamentally new design rational and with fundamentally new building tools.

SUMMARY OF THE INVENTION

In view of the foregoing, and motivated for achieving DHKE protocols of tag-based robust non-malleability (TBRNM) in accordance with the YYZ framework of [38], as well as deniability and post-ID privacy and optimal online efficiency, it is an exemplary feature of the present invention to provide a new highly-practical method and structure for a player to non-malleably prove its joint DH-knowledge, which is named as self-sealed join proof-of-knowledge (SSJPOK). The SSJPOK is fundamental to DH-based cryptographic applications (particularly, authentication and key-exchange), and of wide applications.

It is another exemplary feature of the present invention to demonstrate applications of the invented SSJPOK. As a core application of SSJPOK, the inventors develop a family of protocols, referred to as the YYZ protocol family, which essentially (maybe arguably) achieves the optimal in the integrity of TBRNM security, deniability and post-ID privacy, protocol efficiency and simple system setup, while still being remarkably of conceptual simplicity and clarity. Other applications of SSJPOK, with various embodiments and variants of SSJPOK and the YYZ protocol family, include key-exchange protocols specified for various settings, e.g., group, wireless, certificate-less, distributed client/server, etc. The new observations, and the clarifications/justifications of the underlying design rational of SSJPOK and YYZ are themselves of independent value, which provide new insights into the subtle area of DHKE and can shed light on future DHKE developments.

It is another exemplary feature of the present invention to extend the foregoing methods and structure of DHKE into the password-based and client-server setting, and to provide an authenticated password-based DHKE protocols with robust resistance against malicious disclosure of the contents of password database maintained by the server.

Therefore, it is an exemplary feature of the present invention to provide a structure and method for improving the security, privacy, and efficiency of authenticated DHKE protocols in which security, as well as the soundness and robustness of the underlying design rational, can be provably demonstrated and carefully justified by implementing therein the concepts of SSJPOK.

BRIEF DESCRIPTION OF THE DRAWINGS

The foregoing and other purposes, aspects and advantages will be better understood from the following detailed descriptions of preferred embodiments of the invention with reference to the drawing, in which:

FIG. 4 shows an exemplary embodiment of the SSJPOK method and structure 400, where the verifier contributes only one ephemeral DH-component and verifies $\sigma=(YB^{h(Y,m)})^x$ at 402, the prover contributes one ephemeral DH-component and one fixed DH-component and $\sigma=X^{b+h(Y,m)y}$ is shown at 401.

FIG. 5 shows a further extended and generalized exemplary embodiment of the SSJPOK method and structure 500, where both the verifier and the prover contribute multiple DH-components. The player $\hat{B}$ is shown at 501 and the player $\hat{A}$ is shown in 502, where the values satisfying the conditions as described at 503, 504, and 505, respectively.

FIG. 6 shows an exemplary embodiment of YYZ DHKE protocol by using SSJPOK 600;

FIG. 13 gives graphic and philosophic illustrations 1300 (by an old adage of an ancient philosopher of China) of TBSS 1301, SSJPOK 1302, and YYZ 1303.

DETAILED DESCRIPTION OF PREFERRED EMBODIMENTS

Figure 1:
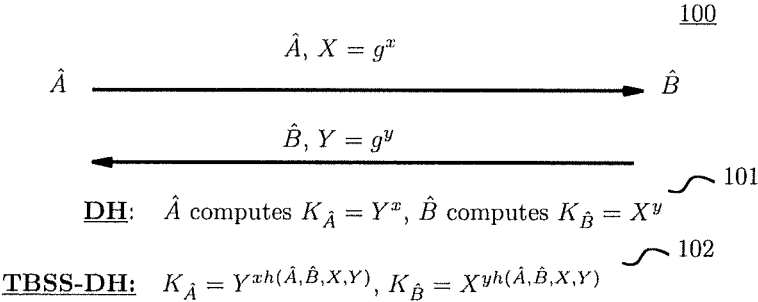
FIG. 1 shows the comparisons 100 between the basic (unauthenticated) Diffie-Hellman protocol 101, and the tag-binding self-sealed DH (TBSS-DH) protocol 102 developed by the inventors.

Referring now to the drawings, and more particularly to FIGS. 1-13, wherein are shown exemplary embodiments of the methods and structures according to the present invention.
Preliminary Notes As a preliminary note on groups and notations, all the protocols and operations discussed herein assume a cyclic subgroup G of a finite group G', where the order of G' is N, there order of G is q of G', g is a generator of G, where q is a large prime (typically, $|q|=160$, where $|q|$ denotes the bit length of q, e.g., $|q|=\lfloor \log_2 q \rfloor$ meaning the logarithm of q to base 2). The inventors use multiplicative representation of group operations herein, but the treatment is equally applicable to additive groups, e.g., elliptic curves or any other algebraic groups or specific groups, finite fields, composite moduli, etc. The operations of exponents are assumed to be module q, while operations of group elements are assumed to be module N. For simplicity, the parameters G, q, g are assumed to be fixed and known in advance to the parties, as is common in practice. Alternatively, one could include these values in certificate, or exchange and agree with these parameters prior to the protocol run. The inventors use upper case letters (e.g., A,B) to denote DH-components (particularly public-keys of players) in the group G, and use corresponding lower case letters (e.g., a, b) to denote the corresponding DH-exponent in $Z_q$, where $Z_q$ denote the set of integers $\{0, 1, \ldots, q-1\}$. Denote by $Z_q^*$ denote the set of integers $\{1, 2, \ldots, q-1\}$. Denote by $1_G$ the identity element of the group G'. The inventors uses "hat notation" (e.g., $\hat{A},\hat{B}$) to denote the logical or "distinguishing" identities of parties in the protocol, such as a name, an email address and/or network (IP) address, a role, etc. In some cases these identities may be augmented with a digital certificate. It is assumed that the computational Diffie-Hellman (CDH) assumption holds with respect to G, which means no efficient probabilistic polynomial-time (PPT) algorithm, given two elements $X=g^x$ and $Y=g^y$ where x and y are taken randomly from $Z_q$, can compute out $g^{xy}$ with non-negligible probability (the probability is taken over the random coins of the algorithm and the choice of x and y). The value $g^{xy}$ is referred to as the (shared) DH-secret with respect to X and Y. $\{\bullet, \ldots, \bullet\}$ denotes a set of messages/values. $G/1_G$ denotes the set of values in G except for the identity element $1_G$.

Hash functions are used to convert a string of characters to a number, a fixed-length string, etc. Typically, the string of arbitrary characters is first encoded into a 0-1 string in $\{0,1\}^*$ (here $\{0,1\}^*$ denotes the set of all 0-1 strings), and then applying the hash function on the 0-1 string to convert into a fixed-length 0-1 string. The basic functionality of hash functions in cryptography is to provide for a "one-way" or "irreversible" transformation, meaning that it should be infeasible to retrieve the original data, and also infeasible to construct a data block that matches a given hash value. Hash functions may range from simple "mixing" functions to transformations that resemble purely random scrambling. The latter are referred to as "strong cryptographic hash functions" and, are often modeled in cryptographic analysis by ideal random functions (or random oracles). Several hash functions are widely used for strong cryptographic hashing. For example, MD5 takes an arbitrarily-sized block of data as input and produces a 128-bit hash; Another example is the NIST (National Institute of Standards and Technology) Secure Hash Algorithm (SHA) that provides a 160-bit hash. For presentation simplicity, the inventors use the same symbol to denote (the same) hash function but with various number of arguments. In practice, the various number of arguments of the hash function in various applications are further concatenated and coded into one string, and then apply the hash function to convert the concatenated string into the output of the hash function. Also, in some applications, only a substring of the hash output is used. In many cases, the order of the arguments of hash functions are not critical (and can be changed).

The present inventions use a conversion function $h: \{0,1\}^* \to Z_q^*$, and hash functions $H_K$, $H$. In particular, $h: \{0,1\}^* \to Z_q^*$ can be a hash function and can be identical to $H_K$, $H$. In general, some other forms of the conversion function $h: \{0,1\}^* \to Z_q^*$ are: $h(X) = X \bmod q$ or $(X \bmod p) \bmod q$ or just the x-coordinate of X in case X is a elliptic curve point, $h(X,Y) = X \bmod q \oplus Y \bmod q$, $h(X,Y,Z) = X \bmod q \oplus H(Y,Z)$ where $H: \{0,1\}^* \to Z_q^*$ is a hash function. In the random oracle model, $h$, $H_K$, $H$ are abstracted as random functions (i.e., the ideal random oracles RO) in the security analysis.

Re-Investigation of the Original Diffie-Hellman Protocol

The inventors re-investigate the Diffie-Hellman protocol (as shown in FIG. 1) and its some important extensions or applications, observe and clarify some fundamental issues that were not previously (at least explicitly) addressed in the literature. These issues are about players' fairness, and the subtleties of using the shared DH-secret as a building block (particularly multiplied with multiple DH-secrets) for building more advanced and complex cryptographic objects.

With respect to the original DH-protocol (depicted in FIG. 1), by fairness, it means that the shared DH-secret, i.e., the value $g^{xy}$, between the parties $\hat{A}$ and $\hat{B}$, should be random both with X as the base (against possibly malicious $\hat{B}$) and with Y as the base (against possibly malicious $\hat{A}$). Specifically, for mutual fairness, $\hat{A}$ (resp., $\hat{B}$) hopes to be guaranteed that y (resp., x) is randomly distributed over $Z_q^*$, where $Z_q^*$ denote the set of integers $\{1, \ldots, q-1\}$. Clearly, the original DH-protocol does not achieve this fairness goal. Moreover, for the original DH-protocol, the responder has (seemingly) more advantageous power to affect the secret output than the initiator.

In many applications, the shared DH-secret is in turn used as the building block (particularly multiplied with other DH-secrets) to build more advanced and complex cryptographic objects (e.g., group Diffie-Hellman key exchange, etc). It is not clear (at least not explicitly addressed) previously what is the necessary property to securely ensure such modular uses of DH-secrets as building blocks. The inventors observe herein that the intuition here for non-malleable modular use of shared DH-secrets is: no matter what the possibly malicious $\hat{A}$ or/and the possibly malicious $\hat{B}$ do, and no matter what the outside components (of the advanced and complex cryptographic objects) that are composed with the DH-secret are, the shared DH-secrets for (successful-finished) sessions of different tags should always be independent at random (i.e., distributed over $G/1_G$ randomly and independently), where $G/1_G$ denotes the elements of G except for the identity element $1_G$. The inventors name this property as tag-binding self-seal (TBSS).

Definition of tag-binding self-sealed (TBSS) DHKE: Denote by U the uniform distribution over $G/1_G$, by $Z_{Tag}$ the (distribution) of the shared DH-secret for any successfully-finished session specified by the session-tag Tag, and by |TAG| the number of all possible (successful) sessions of different tags. A DHKE protocol is said to be tag-binding self-seal, if the distribution of $\{Z_{Tag}\}$, for all possible successful sessions of different tags, is identical to that of $(U)^{|TAG|}$. Note that the definition of TBSS does not require random DH-component contributions in each session.

To render the tag-binding self-seal property to the original DH-protocol, we define the DH-secret to be $Y^{xh(Tag)} = g^{xyh(Tag)} = X^{yh(Tag)}$, where Tag=$(\hat{A}, \hat{B}, X, Y)$ and $h: \{0,1\}^* \to Z_q^*$ is a conversion function (in particular, a hash function). This protocol variant is named tag-binding self-sealed Diffie-Hellman (TBSS-DH), which is also depicted in FIG. 1 (102), and graphically illustrated in FIG. 13 (1301). The TBSS property can be easily checked in the random oracle model (by assuming h as truly random function), here the probability is taken over the choice of the random function of $h: \{0,1\}^* \to Z_q^*$ in the random oracle model. In practice, when a hash function of $h: \{0,1\}^* \to \{0,1\}^l/\{0\}$ is used, a DHKE protocol is called tag-binding self-sealed, if for any value $\alpha \in G/1\_G$, and any tag Tag of a successfully completed session, $$Pr[Z_{Tag} = \alpha] \le \frac{1}{2^l - 1}$$

(the probability is taken over the choice of the random function h in the random oracle model). In case a hash function $h: \{0,1\}^* \to \{0,1\}^l$ is employed in practice, for any value $z \in \{0,1\}^*$, in case $h(z)=0$ the value of $h(z)$ is defined to be a non-zero value in some predetermined manner (e.g., defining $h(z)$ to be a value between $2^l+1$ and $q-1$, etc).

It is also easy to check the mutual fairness of both players. Specifically, x and $yh(\hat{A},\hat{B},X,Y)$ (resp., $xh(\hat{A},\hat{B},X,Y)$ and y) are independent in the random oracle model (assuming hash functions to be random functions), no matter how the DH-components X,Y are chosen. But the inventors remind that both DH and TBSS-DH protocols do not provide mutual identifications. (Note that in case the computation of the shared DH-secret does not involve player's identities, the authentication and/or key-derivation functions (KDF) should depend upon them.)

The inventors show that the lack of tag-binding self-seal (and fairness) can cause essential security concerns for DH-protocols. The inventors demonstrate this with the Burmester-Desmedt protocol (BD-protocol) that is an elegant extension of the original DH-protocol into the group setting, and the (H)MQV protocol that is currently one of the most successful and widely-standardized DHKE protocols.

Re-Examination of the Burmester-Desmedt Group Diffie-Hellman Protocol

Suppose $\hat{U}_1, \hat{U}_2, \ldots, \hat{U}_n$, n>2, be a group of parties who want to share a common group key among them. The BD-protocol (by Burmester et al in Advances in Cryptology-Proceedings of EUROCRYPT'94, pages 279-290, May 1994) works as follows: Each $\hat{U}_i$, $1 \leq i \leq n$, computes and broadcasts $X_i = g^{x_i}$ for $x_i$ randomly taken from $Z_q^*$; After that, each $\hat{U}_i$ computes and broadcasts $Z_i = (X_{i+1}/X_{i-1})^{x_i}$ (where the indices are taken in a cycle); Finally $\hat{U}_i$ computes the shared DH-secret $K_i = (X_{i-1})^{nx_i} \cdot Z_i^{n-1} \cdot Z_{i+1}^{n-2} \ldots Z_{i-2} = g^{(x_1 x_2 + x_2 x_3 + \ldots + x_n x_1)}$ Note that the tag for a successfully finished BD-protocol session is $(\hat{U}_1, \hat{U}_2, \ldots, \hat{U}_n, X_1, X_2, \ldots, X_n)$.

The inventors demonstrate a attack against the BD-protocol with n=3, where $\hat{U}_1$ colludes with $\hat{U}_2$ to be against the honest $\hat{U}_3$ (the attack can be easily extended to the general case of n>3, where some malicious players collude to be against sets of honest players). $\hat{U}_2$ sets $X_2$ to be $X_1^{-1}$ (i.e, $x_2 = -x_1$), then the shared DH-secret is $K_1 = K_2 = K_3 = g^{-x_1^2}$, no matter what DH-exponent $x_3$ is chosen by the honest $\hat{U}_3$. Note that, as $x_1$ may be maliciously generated by $\hat{U}_1$, the shared DH-secret $g^{-x_1^2}$ can be arbitrary value in G (with no guarantee on its randomness and independence). Furthermore, suppose the colluding $\hat{U}_1$ and $\hat{U}_2$ use the same $X_1$ and $X_2 = X_1^{-1}$ in different sessions, then the shared DH-secrets among different sessions are the same, i.e., always $g^{-x_1^2}$, no matter what efforts are made desperately by the player $\hat{U}_3$ (actually any other player). This attack clearly indicates that the BD-protocol is not tag-binding self-sealed, and the lack of the TBSS property can cause essential (even serious) security concern for DHKE protocols. The inventors note that the TBSS and fairness issues of DHKE and particularly the above attack were not previously clarified and dealt with in the literature. In particular, the inventors note that even the universally composable (UC) version of the BD-protocol, by Katz et al, still does not frustrate the above attack (specifically, the TBSS and fairness issues and particularly the above attack were not captured by the UC framework for group DHKE).

The inventors present a variant of the BD-protocol, named (mutually) contributable BD (cBD), in the spirit of TBSS-DH (depicted in FIG. 1, 102). The cBD protocol works as follows: Each $\hat{U}_i$, $1 \leq i \leq n$, computes and broadcasts $X_i = g^{x_i}$ for $x_i$ randomly taken from $Z_q^*$ After that, $\hat{U}_i$ computes and broadcasts $Z_i = X_{i+1}^{x_i h(\hat{U}_i, X_i, X_{i+1})}/X_{i-1}^{x_i h(\hat{U}_{i-1}, X_{i-1}, X_i)}$; Finally, $\hat{U}_i$ computes the DH-secret $K_i = (X_{i-1})^{nx_i h(\hat{U}_{i-1}, X_{i-1}, X_i)} \cdot Z_i^{n-1} \cdot Z_{i+1}^{n-2} \ldots Z_{i-2}$ $(= g^{x_1 x_2 h(\hat{U}_1, X_1, X_2) + x_2 x_3 h(\hat{U}_2, X_2, X_3) + \ldots + x_n x_1 h(\hat{U}_n, X_n, X_1)})$.

It's easy to check that our cBD protocol ensures the following properties in the random oracle model: (1) For any i, $1 \leq i \leq n$, as long as $\hat{U}_i$ is honest, it is guaranteed that the shared DH- secret $K_i$ is random (i.e., randomly distributed in $G/1_G$); The reason is, for each j, $0 \leq j \leq n-1$, $g^{x_j x_{j+1} h(\hat{U}_j, X_j, X_{j+1})}$ is essentially self-sealed that is itself random, and is independent from (i.e., cannot affect) other multiplying components $g^{x_k x_{k+1} h(\hat{U}_k, X_k, X_{k+1})}$'s as long as $(\hat{U}_j, X_j, X_{j+1}) \neq (\hat{U}_k, X_k, X_{k+1})$. (2) For different (successful) sessions of different tags, the shared DH-secrets are independent. The cBD protocol can be converted into an authenticated group KE by the general technique of Katz and Yung (in Advances in Cryptology-Proceedings of CRYPTO'03, pages 110-125, August 2003), and password-based group KE by the technique of Abdalla et al (in the Proceedings of International Conference on Theory and Practice in Public-Key Cryptography PKC'06, pages 427-442, 2006).

Reinvestigation of (H)MQV

The inventors re-investigate (H)MQV in accordance with the recently proposed YYZ framework for DHKE, and show that (H)MQV fails in achieving tag-based robust non-malleability in general. This is demonstrated by concrete attacks, which are partially allowed by the lack of tag-binding self-seal of the shared DH-secret of (H)MQV.

The first attack: Suppose the malicious $\hat{A}$ takes $X \in G$ as the auxiliary input, where X can be arbitrary value in G and $\hat{A}$ does not know the discrete logarithm (i.e., the DH-exponent) of X, $\hat{A}$ works as follows:

(1) $\hat{A}$ computes d, where $d = 2^l + (X \bmod 2^l)$ for attacking MQV or $d = h(X, \hat{B})$ for attacking HMQV. Then, $\hat{A}$ selects an arbitrary value $z \in Z_q$, computes $A = (X^{-1})^{d^{-1}} \cdot (g^z)^{d^{-1}}$, and registers A to Certificate Authority (CA) as its public-key.

(2) $\hat{A}$ initiates a session with $\hat{B}$, and sends X (appeared in its auxiliary input) to $\hat{B}$ Note that $\hat{A}$ does not know the discrete logarithm of X.

(3) After receiving Y from $\hat{B}$, $\hat{A}$ computes $K_{\hat{A}} = (YB^e)^z$ and the session-key $K = H_K(K_{\hat{A}})$, where $e = 2^l + (Y \bmod 2^l)$ for MQV and $e = h(Y, \hat{A})$ for HMQV. The honest $\hat{B}$ computes $K_{\hat{B}} = (XA^d)^{y+eb}$ and the session-key $H_K(K_{\hat{B}})$.

Note that $K_{\hat{B}}(XA^d)^{y+eb} = (X \cdot ((X^{-1})^{d^{-1}} \cdot (g^z)^{d^{-1}})^d)^{y+eb} = (X \cdot (g^{(-x \cdot d^{-1}) + (z \cdot d^{-1})})^d)^{y+eb} = (X \cdot (g^{(-x+z) \cdot d^{-1}})^d)^{y+eb} = (X \cdot g^{-x+z})^{y+eb} = (g^z)^{y+eb} = (g^{y+eb})^z = (YB^e)^z = K_{\hat{A}}$. This shows the validity of the attack. Also note that the shared DH-secret $K_{\hat{A}} = (YB^e)^z$ is not tag-binding self-sealed, e.g., consider that z=0.

The second attack: After receiving X from the uncorrupted player $\hat{A}$ (actually, as X is commonly pre-computed, it is more likely to be leaked prior to the protocol run), the malicious $\hat{B}$ computes $d = 2^l + (X \bmod 2^l)$ and registers $B = X^{-d^{-1}} \cdot g^z$ as its public-key; Then, $\hat{B}$ responds Y=X to $\hat{A}$ in the second round. Note that for MQV, in this case, d=e and y=x as Y=X. Also, note the secret-key corresponding to B is $b = -xd^{-1} + z$. Now, $\hat{B}$ computes $K_{\hat{B}}(=K_{\hat{A}}) = (XA^d)^{y+eb} = (XA^d)^{x+d(-xd^{-1}+z)} = (XA^d)^{dz}$. Again, $\hat{B}$ actually does not know either b or y=x.

For both of the above attacks, the malicious player successfully finishes the session, but without knowing either the static secret-key or the ephemeral DH-exponent. The above attacks can also be trivially modified (actually simplified) to be against the one-round HMQV variant shown in FIG. 7. As the sessions in the above attacks can be of distinct tag and are internally-unexposed at the honest player side (actually, the adversary does not exploit any ephemeral private values), this shows (H)MQV is not robust non-malleable secure in general, in accordance with the YYZ framework of. Note that as the adversary does compute out the shared DH-secret (and thus the session-key), MAC authentications as required in the third-round (H)MQV variants do not prevent the attacks. Also, explicitly putting players' identities into key derivation cannot prevent the attacks. The inventors remark that even if the damages caused by the above attacks may not be very clear in certain scenarios, one key point is: suppose now one knows when it finishes a session its peer actually knows neither the DH-exponent nor the secret-key (corresponding to the DH-component and public-key sent and alleged by the peer), does it still have strong confidence that your security is well guaranteed (particularly if the one is taking part in some critical missions)?

The first attack can be prevented by explicitly requiring proof-of-knowledge/proof-of-possession (POK/POP) of secret-key during public-key registration, and the second attack can even be prevented if each player knows and makes sure the validity of its peer's public-key prior to the protocol run. But, such remedies complicate the system complexity and may limit protocol deployments; Also, the post-ID computability (i.e., learning peer's identity and public-key only during the evolution of protocol run) is also desirable for preserving players' privacy. The inventors suggest that it is highly prefer-able for a DHKE protocol itself to ensure the essential security properties (expected for DHKE), in a way as robust as possible while without much resorting to additional requirements on the system environments beyond the protocol itself (or relying on such additional requirements as minimal as possible). The inventors remark that POP/POK during key registration is explicitly abandoned in HMQV, and was not mandated for many practical deployments of (H)MQV, because it is commonly believed that (H)MQV should guarantee mutual identifications and particularly in view of that POP/POK was not the point to prevent Kaliski's unknown key share (UKS) attacks (in ACM Transactions on Information and System Security, 4(3): 275-288, 2001).

Patching approaches: The inventors present herein some fixing approaches without requiring POK/POP or pre-knowing peer's ID and public-key, in the spirit of adding tag-based self-seal to the shard DH-secret. Specifically, for the two-round and three-round (H)MQV variants, set (1) d=h($\hat{A}$, A, X) and e=h($\hat{B}$,B,Y) or, (2) d=h(X,$\hat{B}$,A) and e=h(Y,$\hat{A}$,B); or (3) d=h($\hat{A}$,A,$\hat{B}$,B,X,Y) and e=h(d), etc. For the one-round (H)MQV variant, set d=h($\hat{A}$,A,$\hat{B}$,B,X). Other components remain the same as those of (H)MQV.

Figure 2:
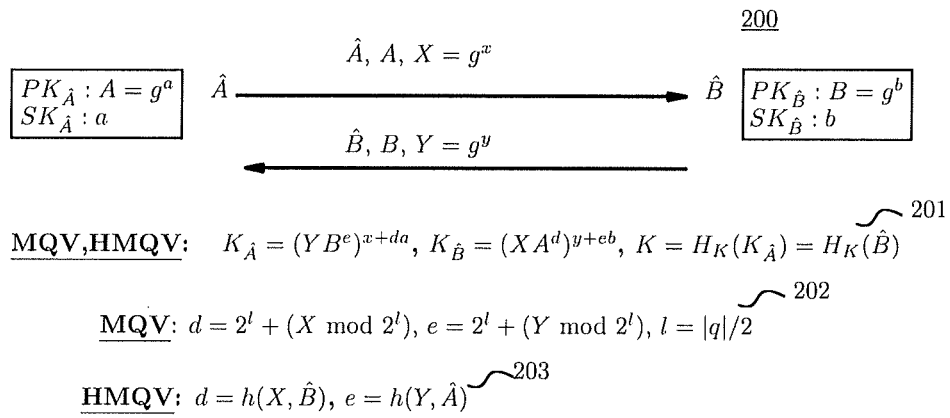
FIG. 2 shows the comparisons 200 among the MQV protocol 201 and 202, the HMQV protocol 201 and 203, the YYZ-MQV protocol 204 and 205 (which improves MQV and HMQV and is developed by the inventors with SSJPOK as the building tool), and the YYZ protocol 206 and 207. All the embodiments illustrated in FIG. 2 are 2-round protocols without explicit key confirmations.

The inventors prefer the first fixing proposal above. Here, the inventors make some further modifications. Specifically, define $K_{\hat{A}}=(Y^e B)^{xd+a}$, $K_{\hat{B}}=(X^d A)^{ye+b}$, where d=h($\hat{A}$, A, X) and e=h($\hat{B}$,B,Y). The session-key is still $K=H_K(K_{\hat{A}})=H_K(K_{\hat{B}})$. This protocol is named as YYZ-MQV, which is depicted in FIG. 2 (204,205). (In case of POK/POP is explicitly required during key registration and/or each player possesses an authenticated copy of its peer's public-key certificate, the public-key inputs could also be removed from the inputs of d and e). In practice, it is suggested that each player's public-key certificate itself includes the hashed value of the player's identity and public-key, which will be verified and authorized by the CA. In this case, ($\hat{A}$, A) and ($\hat{B}$, B) in the inputs of d, e can just be replaced by their hashed values already included in the certificates.

The inventors briefly note that all the above attacks fail with YYZ-MQV. YYZ-MQV further enjoys the following advantageous features:

(1) YYZ-MQV is tab-binding self-sealed.

(2) The values (x,da) (resp., (y,eb) are independent in the random oracle model, no matter how the malicious $\hat{A}$ (resp., $\hat{B}$) does.

(3) The value x+da (resp., y+eb) can be pre-computed by $\hat{A}$ (resp., $\hat{B}$) without knowing its peer's information. Moreover, the value $B^{x+da}$ (resp., $A^{y+eb}$) can be pre-computed by $\hat{A}$ (resp., $\hat{B}$) offline.

Actually, the underlying design rational of YYZ-MQV is fundamentally different from that of (H)MQV, which is to be further clarified in the subsequent sections.

Self-Sealed Joint Proof-of-Knowledge

The core for secure DHKE protocols is: when a player successfully finishes an internally-unexposed session (referred to the test-session), it should be "guaranteed" that its peer does indeed know the static secret-key and the ephemeral DH-exponent (corresponding to the public-keys and DH-component alleged and sent by the peer). As the DHKE protocols are run concurrently in adversarial asynchronous settings like the Internet, such "guarantee" should hold even against any efficient concurrent man-in-the-middle (CMIM) adversary who controls all communication channels, can learn any ephemeral private values of any sessions other than the test-session, and is of arbitrary auxiliary input. Assuming players are of discrete logarithm (DL) public-keys, the inventors propose herein a new and highly practical approach for proving such joint DH-knowledge, along with detailed clarifications and discussions.

Suppose the player $\hat{A}$ (resp., $\hat{B}$) is of public-key $A=g^a$ (resp., $B=g^b$) with the secret-key a (resp., b) taken randomly and independently from $Z_q^*$. We assume that the underlying public-key infrastructure (PKI) requires no proof-of-knowledge (POP) or proof-of-possession (POP) of secret-key during key registration, but the CA will check the (non-identity) sub-group membership for the registered public-keys (i.e., make sure the registered public-keys are in $G/1_G$). Here, $G/1_G$ denotes the set of values in G except for the identity element $1_G$.

The starting point is the following joint proof-of-knowledge methodology (developed by Yao et al, Cryptology ePrint Archive No. 2007/191, available from http://eprint.iacr.org/2007/191): to prove its knowledge of secret-key and DH-exponent (e.g., for the party $\hat{B}$ of public-key B and ephemeral DH-component $Y=g^y$), $\hat{A}$ sends $X=g^x$ to $\hat{B}$, and $\hat{B}$ responds back $\{Y=g^y, JPOK_{(b,y)}=H_K(X^b,X^y)\}$, Here, $JPOK_{(b,y)}$ stands for the joint proof-of-knowledge of both the secret-key b and the DH-exponent y w.r.t. the random challenge X.

Besides the computations of DH-component Y and the sub-group test of its peer's DH-component X (some techniques to reduce the complexity of subgroup test will be discussed later), $\hat{B}$ needs to perform about 1.2 exponentiations (note that the computations of $X^b$ and $X^y$ in parallel actually amount to 1.2 exponentiations). Besides other computations, $\hat{A}$ needs to perform about two exponentiations $(B^x, Y^x)$ to verify the correctness of the value $H_K(X^b, X^y)$. In order to improve the computational complexity of this authentication methodology, one natural attempt is as follows: the value of $H_K(X^b, X^y)$ is replaced by $H_K(X^{b+y})$. By such modification, $\hat{B}$ only needs to perform one exponentiation to compute $H_K(X^{b+y})$, and $\hat{A}$ needs only 1.5 exponentiations (note that the computation of $X^{b+y}=B^x Y^x$ by $\hat{A}$ amounts to 1.5 exponentiations).

But, such modification turns the originally robust authentication methodology into a fundamentally flawed protocol. Consider the following attack: an adversary Д can simply impersonate $\hat{B}$ by setting $Y=B^{-1}g^z$ for any value $z \in Z_q$ Note that y=-b+z in this case, and Д can trivially compute out $JPOK_{(b,y)}=H_K(X^{b+y})=H_K(X^z)$, but actually without knowing either b or y. That is, Д can malleate B and Y into $X^{y+b}$ by maliciously correlating the values of y and b, but actually without knowing either of them. Note that for a malicious $\hat{B}$, the values of b and y can be arbitrary values in $G/1_G$ and thus can be maliciously correlated.

In view of the above observation, one natural attempt for remedying the situation is to mask the exponents b and y by some random values. In this case, the proof is $JPOK_{(b,y)}=H_K(X^{db+ey})$, where d and e are random values. This intuition turns out also to be wrong. With the values d=h(Y,$\hat{A}$) and e=h(X,$\hat{B}$) as an illustrative example, after receiving X a malicious $\hat{B}$ generates and sends $Y=B^{-d/e}$, and in this case $JPOK_{(b,y)}=H_K(X^{db+ey})=H_K(1_G)$. Note that, as the underlying PKI does not require POK/POP during key registration, the malicious $\hat{B}$ does not necessarily know b and thus also y. This attack shows that masking b and y by random values is not sufficient for ensuring the non-malleability of the JPOK. Note that, no matter what a malicious $\hat{B}$ does, both db and ey are indeed randomly distributed over $Z_q^*$(in the random oracle model), but the key point here is that they are not necessarily independent.

To ensure the independence between db and ey, one way is: we put the values (B, 0) into the input of d, and put the values (Y, 1) into the input of e. By this way and viewing h as a random oracle, no matter how the adversary forms B and Y, the values B and b are independent from the value d=h(B,0) (that is an independent random value by the random oracle assumption of h), and the values of Y and y are independent from the value of e=h(Y,1) Also, the values d and e are independent (even if B=Y). That is, no matter what adversarial strategies are employed by the possibly malicious $\hat{B}$, the values db and ey are always independent (both of which distribute uniformly over $Z_q^*$ in the random oracle model). It might be okey if we only consider the security of the honest knowledge verifier $\hat{A}$ against the possibly malicious knowledge prover $\hat{B}$, But, this solution is still insufficient for our purpose, specifically, for the non-malleable modular use of $X^{db+ey}$ as building tool for achieving higher-level cryptographic objects. For example, to further strengthen the security of the honest knowledge-verifier and to provide mutual authentications, we consider the following modular use of the $X^{db+ey}$: define the shared DH-secret to be $A^{cy}X^{db+ey}=B^{dx}Y^{ca+ex}$, where c=h(Y), d=h(B) and e=h(Y); and require $\hat{B}$ send $H_K(1,A^{cy}X^{db+ey})$ and $\hat{A}$ send $H_K(0,B^{dx}Y^{ca+gx})$ for mutual authentications and identifications. Clearly, this strengthens the security of the honest player $\hat{A}$ against possibly malicious $\hat{B}$, and provides seemingly reasonable mutual authentications and identifications. But, the intuition about mutual authentications/identifications is also wrong. Specifically, consider the following attacks: (1) Key Comprise Impersonate (KCI) vulnerability: if the static secret-key b is leaked to a malicious player $\hat{A}$, $\hat{A}$ can set $X=A^{-1}$ and then compute out $B^{dx}Y^{ca+ex}=B^{dx}=X^{db}$, but actually without knowing either a or x. (2) If $\hat{A}$ can set its public-key based its peer's DH-component (e.g., when $\hat{A}$ works in the post-ID model), $\hat{A}$ can set $X=Y$ and $A=(B^dY^e)^{-c^{-1}}$, an then compute out $B^{dx}Y^{ca+ex}=1_G$, again without knowing either a or x. We remark that the underlying reason beneath the above attacks, which is somewhat subtle, is just the lack of tag-binding self-seal of $\text{JPOK}_{(b,y)}=X^{db+ey}$ for d=h(B) and e=h(Y). For example, the values $X^{db+ey}$ and $X'^{db+ey}$ derived from two different tags $(\hat{A},\hat{B},B,Y,X)$ and $(\hat{A},\hat{B},B,Y,X')$, where $X'\neq X$ but correlated (e.g., $X'=X^2$), are clearly not independent. This demonstrates, once again, the lack of TBSS can leave potential trapdoors for maliciously using the shared DH-secrets (i.e., JPOK in this case) as the modular building block to achieve higher-level cryptographic objectives.

All the above clarifications and discussions are boiled down to that, to achieve the tag-based robust non-malleability (in accordance with the YYZ framework for DHKE protocols) of the joint proof-of-knowledge $\text{JPOK}_{(b,y)}=X^{db+ey}$, $\text{JPOK}_{(b,y)}$ must ensure:

1. db and ey are independent over $Z_q^*$ for any non-identity DH-components B and Y, no matter what a malicious knowledge-prover $\hat{B}$ does (i.e., forms B and Y). A stronger requirement is: the values dbx and eyx are independent over $Z_q^*$ for any non-identity DH-components X or Y,B, no matter how a malicious $\hat{B}$ or a malicious $\hat{A}$ does (in forming X or Y,B). The probability is taken over the choice of the random function h and the coins used by $\hat{B}$ or $\hat{A}$ (in forming X or Y,B).

Here, random variables $X_1, X_2, \ldots, X_k, n\geq 2$, are independent over $Z_q^*$ if, except for at most one j, $1\leq j\leq n$, for all other i, $1\leq i\neq j\leq n$, and for any value $\alpha \in Z_q^*$ (except for a negligible fraction of values in $Z_q^*$), the probability $\Pr[X_i=\alpha]$ is negligible (possibly in the RO model). The probability is taken over the choice of the random function h and the coins used by $\hat{B}$ or $\hat{A}$. Furthermore, given a value $\beta$ of $X_i$, and the coins of $\hat{B}$ or $\hat{A}$ used to generate $\beta$, the value of $X_j$ is determined with overwhelming probability (except for some negligible probability gap).

(In certain scenarios or applications, e.g., in case each player possesses an authenticated copy of its peer's public-key certificate prior to the protocol run and generates fresh ephemeral DH-components during the evolution of protocol run, and/or explicit POK/POP of key registration, the above independence requirements may be relaxed, to hold only for any (non-identity) ephemeral DH-components, i.e., no matter how the non-identity ephemeral DH-components are generated by the malicious player.)

2. The shared DH-secret, i.e., $X^{db+ey}$, is tag-binding self-sealed. Or, d and e at least commit to the partial session-tag known by $\hat{B}$ at the point of sending $X^{db+ey}$ (e.g., when $\hat{A}$ works in the post-ID model).

Here, the (possibly partial) session-tag is divided into two subsets of components: one subset containing the components contributed by $\hat{A}$ (i.e., a subset of $\{\hat{A},A,X\}$), and one subset containing the components contributed by $\hat{B}$ (i.e., a subset of $\{\hat{B},B,Y\}$). Then, commitment in the two party protocol setting means that: given d and e, and the subset of components in the (possibly partial) session-tag contributed by its peer, the rest components in the (possibly partial) session-tag (corresponding to contributions from the possibly malicious party) are then determined with overwhelming probability (no matter how the possibly malicious yet efficient party does). The probability is taken over the choice of the random function h and the coins of the (possibly malicious) player and its peer. In more details, a commitment scheme enables a party to bind itself to some values such that given the transcript of the run of the commitment scheme (e.g., d,e and the subset of components in the session-tag contributed by its peer), the values (i.e., the rest components of the session-tag contributed by the party in this case) committed to are determined, and no efficient (probabilistic polynomial-time) algorithm can decommit the transcript into different values (other than the supposed values committed to) with non-negligible probability (maybe under some cryptographic assumptions).

(In certain scenarios or applications, e.g., in case an authenticated copy of a player's public-key is possessed by its peer prior to protocol run and generates fresh ephemeral DH-components during the evolution of protocol run, and/or POK/POP is explicitly required during key registration, the player's public-key may not be committed to d and e. In case players' identities are not committed to d and e, they should be put into the input of authentication and/or key-derivation functions. In practice, we suggest each player's public-key certificate itself includes the hashed value of player's identity and public-key, and only this hashed value is committed to d and e.)

3. To ease online efficiency, we can additionally require: the value $B^{xd}$ can be pre-computed by $\hat{A}$ offline.

Under the above observations, the inventors propose herein two preferable solutions for joint proof-of-knowledge.

(1) Self-sealed joint proof-of-knowledge (SSJPOK). $\text{SSJPOK}_{(b,y)}=X^{db+ey}$, where $d=h(\hat{A},\hat{B},B,X)$ and $e=h(X;Y)$. Note that, here, d and e are both independent and random in the RO model. The tag-binding self-seal property can be easily checked in the RO model. An Interesting graphic illustration of the SSJPOK is depicted in FIG. 13 (1302). In case the verifier $\hat{A}$ does not reveal its identity until the point of sending $X^{db+ey}$ (e.g., for preserving its privacy), d is set to be $d=h(\hat{B},B,X)$.

(2) Simple SSJPOK (sSSJPOK). $\text{sSSJPOK}_{(b,y)}=X^{db+ey}$, where d=1 and $e=h(\hat{A},\hat{B},B,X,Y)$. Note that, though d and e are not both random, they are indeed independent in the RO model. The tag-binding self-seal property is also trivially satisfied in the RO model.

The $\text{SSJPOK}_{(b,y)}$ is actually the product of two self-sealed POKs (SSPOK): $X^{bd}$ for proving the knowledge of the static secret-key b with $d=h(\hat{A},\hat{B},B,X)$, and $X^{ey}$ for proving the knowledge of the ephemeral DH-exponent y with $e=h(X,Y)$.

But, by the setting mechanism of d and e, the adversarial attempts (whether by malicious $\hat{B}$ or by $\hat{A}$) at $X^b=B^x$ (resp., $X^y$) are essentially sealed, i.e., localized, to $X^b$ (resp., $X^y$), and are isolated (i.e., independent) from the adversarial attempts at another SSPOK $X^{ey}=Y^{ex}$ (resp., $X^{db}$). It is the reason we name it as self-sealed joint proof-of-knowledge. In particular, no matter what the possibly malicious $\hat{B}$ does, the knowledge-prover $\hat{B}$ has to compute two independent DH-secret $X^{db}$ and $X^{ey}$ w.r.t. the fresh random challenge X. By the fresh-challenge knowledge-of-exponent assumption (KEA) against CMIM adversaries of arbitrary auxiliary input, clarified by the inventors in related works, this particularly implies that $\hat{B}$ does indeed "know" both b and y.

Needless to say, there are other SSJPOK candidates. But the above explicitly proposed two solutions enjoy the following advantageous properties, which make them more desirable:

1) Post-ID, offline and modular computability of SSJPOK. SSJPOK allows the knowledge-verifier $\hat{A}$ to work in the post-ID model for preserving privacy. Specifically, as the input of e does not include $\hat{A}$'s identity and public-key, $\hat{A}$ can first send X without revealing its identity information. In this case, $\hat{B}$ can first compute $X^{ey}$, and then $X^{db}$ only after learning $\hat{A}$'s identity and public-key. Also, note that without inputting Y into d allows $\hat{A}$ to pre-compute $B^{dx}=(X^{db})$ prior to the protocol run.

2) Efficiency and minimal RO use of sSSJPOK. sSSJPOK is preferable because of its more efficient computational complexity and the minimal use of random oracle.

Extension: The extended version of SSJPOK, which is named as general SSJPOK (gSSJPOK), is shown in FIG. 5. In the gSSJPOK depiction, $Y_0$ and $B_0$ denote null (empty) values; $B_j, 1 \leq j \leq m_1$, are public-keys (i.e., fixed DH-components) of $\hat{B}$; F is a predetermined polynomial-time computable function, which can be the identity function; $f_{\hat{A}}$ and $f_{\hat{B}}$ are two deterministic polynomial-time computable (maybe identity) functions (computed by $\hat{A}$ and $\hat{B}$ respectively), where the output of $f_{\hat{A}}$ (resp., $f_{\hat{B}}$) is a set of values in $Z_q^*$ (resp., $G/1_G$), satisfying $g^{f_{\hat{A}}(x_1, \ldots, x_n)} = f_{\hat{B}}(X_1, \ldots, X_n)$. In particular, if $f_{\hat{A}}(x_1, \ldots, x_n) = \{x_1, \ldots, x_n\}$ $f_{\hat{B}}(X_1, \ldots, X_n) = \{X_1, \ldots, X_n\}$, and $\{X_1, \ldots X_n\}^z = \{x_1^z, \ldots, X_n^z\}$, where $z = b_1 d_1 + \ldots + b_{m_1} d_{m_1} + y_1 e_1 + \ldots + y_{m_2} e_{m_2}$; The interpretations of "independence" and "session-tag commitment" are direct extension of those for the SSJPOK.

Note that the YYZ-MQV protocol, depicted in FIG. 2 (204) is essentially an instantiation of the gSSJPOK, while MQV and HMQV are not.

Remark: The inventors suggest that the SSJPOK (and also sSJPOK, gSSJPOK) developed herein, as a practical paradigm of proving DH-knowledge jointly and non-malleably, are fundamental to DH-based cryptographic applications (particularly to authentication and key-exchange), and are of wide applications. In particular, they can be applicable to any cryptographic applications using the sign-then-MAC authentication mechanism or involving the multiplications of multiple DH-secrets. One core application of SSJPOK, as demonstrated below, is the YYZ protocol family, which essentially (maybe arguably) achieves the optimal in the integrity of security, privacy and protocol efficiency.

The YYZ Protocol Family

The general structure of the YYZ protocol is depicted in FIG. 6, with SSJPOK as the critical building tool. In the depiction of the general YYZ protocol structure, $\{m_1, m_2, \ldots\}$ denote other messages, other than the DH-components, exchanged in (or related to) the protocol run; $X_i$'s (resp., $Y_j$'s) are (fixed and/or ephemeral) DH-component contributions of the party $\hat{A}$ (resp., $\hat{B}$). KDF is a key-derivation function, and the other functions have interpretations similar to those of gSSJPOK depicted in FIG. 5.

The inventors investigate various instantiations of this general structure for authenticated DHKE, aiming for achieving the best in the integrity of security, privacy, protocol efficiency (as well as conceptual clarity and simplicity, computational symmetry, easy deployment, etc).

Note that the $SSJPOK_{(b,y)}$ with respect to the random challenge X only ensures the player $\hat{A}$ that the player $\hat{B}$ does know both b and y. Denote by $SSJPOK_{(a,x)}$ the joint proof-of-knowledge of a and x given by $\hat{A}$ with respect to the random challenge Y. In order to achieve a secure DHKE protocol (particularly, with mutual identifications and key-confirmations), a natural way is to replace the JPOK mechanism of the deniable Internet key-exchange (IKE) developed by Yao et al (Cryptology ePrint Archive No. 2007/191), i.e., $(X^b, X^y)$ (resp., $(Y^b, Y^a)$), by $SSJPOK_{(b,y)}$ (resp., $SSJPOK_{(a,x)}$). The session-key is still derived from $g^{xy}$. Though this would render a robust and secure DHKE protocol, the resultant DHKE protocol essentially obtains no advantages over the already existing deniable IKE protocol of Yao et al.

Recall that the value $X^{db+ey}$ of $SSJPOK_{(b,y)}$ actually can be used to demonstrate the knowledge of x, as $X^{db+ey} = B^{dx}Y^{ex}$. The key observation now is: in order for $\hat{A}$ to additionally prove the knowledge of the secret-key a, the idea is to multiply the $SSJPOK$ $X^{db+ey} = B^{dx}Y^{ex}$ by another self-sealed $POK Y^{ca}$ for $c = h(\hat{B}, \hat{A}, A, Y)$. This yields $\sigma_{\hat{A}} = B^{dx}Y^{ca+ex} = (B^{dx}Y^{ex}) \cdot Y^{ca} = (X^{db+ey}) \cdot Y^{ca} = (X^{db+ey}) \cdot A^{cy} = A^{cy}X^{db+ey}\sigma_{\hat{B}}$ where $\sigma_{\hat{A}}$ is computed by $\hat{A}$ and $\sigma_{\hat{B}}$ is computed by $\hat{B}$, $c = h(\hat{B}, \hat{A}, A, Y)$, $d = h(\hat{A}, \hat{B}, B, X)$, $e = h(X, Y)$ and the tag determined is $(\hat{A}, \hat{B}, A, B, X, Y)$. Further note that the identity $\hat{A}$ (resp., $\hat{B}$) in the input of c (resp., d) is redundant to ensure tag-binding self-seal of the shared DH-secret $\sigma_{\hat{A}} = \sigma_{\hat{B}}$, and thus can be removed. All the observations boil down to the YYZ protocol, which is depicted in FIG. 2 (206, 207) and graphically illustrated in FIG. 13 (1303). Recall that the underlying PKI requires no proof-of-knowledge (POP) or proof-of-possession (POP) of secret-key during key registration, but the CA will check the (non-identity) sub-group membership for the registered public-keys (i.e., make sure the registered public-keys are in $G/1_G$). Also, with the YYZ protocol family, the hash functions $H_K$, h can be identical.

Ephemeral private values exposable to adversary: The values exposable to adversary from the ephemeral private values generated by the honest $\hat{B}$ (resp., $\hat{A}$) during the protocol run are: y (resp., x) if $\hat{B}$ (resp., $\hat{A}$) does not pre-compute $A^{cy}$ (resp., $B^{dx}$); or $(y, A^{cy})$ (resp., $(x, B^{dx})$) if $\hat{B}$ (resp., $\hat{A}$) pre-computes $A^{cy}$ (resp., $B^{dx}$). Other ephemeral private values are erased promptly after use. Also, all ephemeral private values, except for the session-key in case the session is successfully finished, generated by an honest party within the protocol run are erased after the session is completed (whether finished or aborted). For expired sessions, the session-keys are also erased.

Embedded (Implicit) Subgroup Test

The basic technique to check the DH-component, e.g. X, is in G is to verify $X^q = 1_G$ that needs performing one modular exponentiation. But, if the cofactor $t = N/q$ is small, e.g., $G' = Z_p^*$ such that $p = 2q+1$ or G is the subgroup of an elliptic curve over a finite field (in this case the cofactor t is small constant and can be 1), the subgroup test of X can be essentially reduced to: (1) check $X \in G'$; (2). $X' \neq 1_G$. In general, $X \in G'$ and $X' \neq 1_G$ guarantees that X is not in a (small) sub-group of G' with the order that is a factor of t (but it does not fully guarantee $X \in G$, e.g., consider that $X = -g^x$). This leads to the following YYZ protocol variant (the technique is also applicable to instantiations of SSJPOK and other instantiations of the YYZ general structure):

$K_{\hat{A}} = B^{dxt}Y^{cat+ext}$ and $K_{\hat{B}} = B^{cyt}Y^{dbt+eyt}$, the session-key $K = H_K(K_{\hat{A}}) = H_K(K_{\hat{B}})$, where $c = h(\hat{A}, A, Y)$, $d = h(\hat{B}, B, X)$, $e = h(X, Y)$. The subgroup test is performed as follows: each player verifies that its peer's DH-component is in G'; for the party $\hat{A}$ (resp., $\hat{B}$), if $B^{dxt}$ and $Y^{cat+ext}$ (resp., $A^{cyt}$ and $X^{dbt+eyt}$) are computed separately, $\hat{A}$ (resp., $\hat{B}$) checks that $Y^{cat+ext} \neq 1_G$ (resp., $X^{dbt+eyt} \neq 1_G$); In case of no separate computation, $\hat{A}$ (resp., $\hat{B}$) verifies $K_{\hat{A}} \neq 1_G$ (resp., $K_{\hat{B}} \neq 1_G$). Note that the checking of $K_{\hat{A}} \neq 1_G$ and $K_{\hat{B}} \neq 1_G$, just as done in the elliptic curve based MQV, does not fully guarantee $X^t \neq 1_G$ or $Y^t \neq 1_G$ (i.e., not fully exclude the possibility of DH-components from small subgroups), but it still provides reasonable assurance in the elliptic curve setting.

The inventors note that the damage caused by ignoring subgroup test of peer's DH-component (but still with the super-group G' check) can be much relieved (and even waived) if the ephemeral private values generated by the honest party within the protocol run are well-protected. For example, even if the adversary learns some partial information about db+ey by issuing a small subgroup attack against the honest $\hat{B}$ (by setting X to be in a small subgroup), it still cannot derive the value of b without compromising the ephemeral value y. Further note that the adversary actually cannot derive the full value of db+ey by small subgroup test, as the DH-exponent y is independent at random in each session.

For presentation simplicity and unity, in the rest of application document, it is assumed that t=N/q for implementations with embedded subgroup test (e.g., for elliptic curve based implementations), and t=1 if each player makes sure the (non-identity) subgroup membership of its peer's DH-component.

YYZ Variants

The inventors investigate some useful variants of the YYZ protocol depicted in FIG. 2, which are themselves of independent interest.

Simple YYZ (sYYZ): $K_{\hat{A}} = B^{dxt}Y^{cat+ext}$ and $K_{\hat{B}} = A^{cyt}X^{dbt+eyt}$, the session-key $K = H_K(K_{\hat{A}}) = H_K(K_{\hat{B}})$, where c=d=1 and $e = h(\hat{A}, A, \hat{B}, B, X, Y)$.

Robust YYZ (rYYZ): $K_{\hat{A}} = B^{fa+dxt}Y^{cat+ext}$ and $K_{\hat{B}} = A^{fb+cyt}X^{dbt+eyt}$, the session key $K = H_K(K_{\hat{A}}) = H_K(K_{\hat{B}})$ where $c = h(\hat{A}, \hat{B}, B, Y)$, $d = h(\hat{B}, B, \hat{A}, A, X)$, $e = h(\hat{A}, A, \hat{B}, B, X, Y)$, $f = 0$ for full deniability or $f = 1$ for group deniability. Actually, the function e can be set to be $h(c,d)$ or $h(c,X)$ or $h(d,Y)$. The key point is to put both X and Y into the input of the function e. In particular, if $f=0$, e also can be set to be $h=(X,Y)$. But if $f=1$ and $e=h=(X,Y)$, there are the following weaknesses: the player $\hat{B}$ sets $Y=A^{-1}$ and $B=X^{et}$, then $K_{\hat{B}} = X^{fb+cyt}X^{dbt+eyt}$ is actually equal to $A^{cyt}X^{dbt}$.

One-round YYZ (or YYZ): The player $\hat{A}$ sends $X=g^x$ to $\hat{B}$. Normally, $\hat{A}$ is a client machine and $\hat{B}$ is a server machine. Let $K_{\hat{A}} = B^{a+ex}$ and $K_{\hat{B}} = A^b X^{eb}$, where $e = h(\hat{A}, A, \hat{B}, B, X)$ and the session-key is $K = H_K(K_{\hat{A}}) = H_K(K_{\hat{B}})$. For or YYZ, it is also recommend to set the output length of h to be shorter, e.g., $|q|/2$ (where $|q|$ denotes the bit-length of q), to ease the computation of $K_{\hat{B}} = A^b X^{eb} = (AX^e)^b$ in some application scenarios (e.g., when the pre-computation of $A^b$ is inconvenient). This technique is also applicable to the simple SSJPOK.

Note that, for or YYZ, all the computational complexity of $\hat{A}$ is 2 exponentiations in total and all the computation of $\hat{A}$ can be offline. To improve the on-line efficiency of $\hat{B}$, the player $\hat{B}$ can pre-compute $A^b$ in an off-line way (and store it in a database entry corresponding to the player $\hat{A}$), and only on-line compute $X^{eb}$ and $A^q$ (for explicit subgroup test) which amounts to about 1.2 exponentiations (it is recommended for to explicitly check the subgroup membership of X). In case of embedded subgroup test, $\hat{B}$ should explicitly check $X \in G'$ and $X^{ebt} \neq 1_G$ (only checking $K_{\hat{B}} \neq 1_G$ is not sufficient to prevent the small subgroup attack). Note that the one-round YYZ intrinsically suffers from the KCI vulnerability in case $\hat{B}$'s static secret-key b is compromised, and lacks perfect forward secrecy (PFS). But, in comparison with the one-round HMQV (shown in FIG. 7), or YYZ does not suffer from unknown key share (UKS) attacks, and enjoys much better on-line efficiency.

About key derivation and mutual authentication: For seemingly more robust security, it is recommended to put (c,d) or a subset of the session-tag or a subset of the session-tag (e.g., $\{\hat{A}, \hat{B}\}$ and even just the whole session-tag) also into the input of $H_K$ for the key derivations of the YYZ protocol, and to put e or a subset of the session-tag (e.g., $\{\hat{A}, \hat{B}\}$ and even just the whole session-tag) into the input of $H_K$ for the key derivations of the rYYZ, sYYZ and or YYZ protocols (which is also applicable to the key derivations in various applications of the YYZ protocol family).

For adding mutual authentication to the YYZ protocol family, besides the session-key K a MAC-key $K_m$ is used within the protocol run (but erased after the protocol run). There are various implementations of the key-derivation function (KDF) to generate the session-key and the MAC-key (for presentation simplicity, only key-derivations by the party $\hat{A}$ are specified below): (1) $(K, K^m) \leftarrow H(K_{\hat{A}}, 1) H(K_{\hat{A}}, 2) \ldots H(K_{\hat{A}}, i)$, where i is a counter such that it increases until the concatenation of the hash outputs is longer than the length of $(K, K_m)$; (2). $K_m = H_K(c, d, K_{\hat{A}})$ and $K = H_K(K_{\hat{A}}, c, d)$ for the YYZ protocol; $K_m = H_K(e, K_{\hat{A}})$ and $K = H_K(K_{\hat{A}}, e)$ (for rYYZ, sYYZ and or YYZ protocols), (3). $K_m = H_K(K_{\hat{A}}, 0)$ and $K = H_K(K_{\hat{A}}, 1)$; (4). The hash functions used for session-key derivation and for MAC-key derivation are different, etc. Again, for all possible key-derivation methods, the values (c, d) or e can be put into the input of key derivation functions. In general, KDF can be implemented with a pseudorandom function (PDF).

For mutual authentications of YYZ, rYYZ and sYYZ, $\hat{B}$ sends $t_{\hat{B}} = MAC_{K_m}(1)$ in the second-round, and $\hat{A}$ sends $t_{\hat{A}} = MAC_{K_m}(0)$ in an additional third-round. For mutual authentication of the one-round YYZ, the player $\hat{A}$ can additionally send $t_{\hat{A}} = MAC_{K_m}(0)$ in the first-round, and the player $\hat{B}$ responds back $t_{\hat{B}} = MAC_{K_m}(1)$) in the subsequent round. Here, the message authentication code (MAC) functions are commonly instantiated with HMAC in practice or with pseudorandom functions (PRFs) in general. In the RO model or in practice, the MAC functions can also be just replaced by a cryptographic hash function. Also, the values 0 and 1 in the input of MAC functions are also arbitrary, actually any values can be used as long as they are different.

About putting public-keys and identities into the input of c, d and/or e: The underlying rational of putting the public-key A (resp., B) into the input of c (resp., d) for YYZ, and putting (A,B) into the input e for sYYZ, is to ensure the non-malleability of SSJPOK. This is necessary for deploying the YYZ protocol family in the settings of post-ID and/or key-registration without POK/POP. But, to ease protocol deployments, in case of key registration with POP/POK and/pr each player knows and makes sure the validity of its peer's public-key prior to the protocol run and each player generates fresh ephemeral DH-components during the evolution of protocol run, the public-keys in the input of c, d, e can also be removed.

Putting player identity $\hat{A}$ (resp, $\hat{B}$) into the input of c (resp. d) for YYZ, ($\hat{A}$, $\hat{B}$) into the input of e for sYYZ, plays an essential role for achieving tag-based robust non-malleability (e.g., resistance against UKS attacks, etc). In case one interests with variants with players' identities are removed from c, d and/or e, it is strongly recommend to put player's identities into the input of KDF and explicitly require POK/POK of key registration.

In practice, we suggest each player's public-key certificate itself includes the hashed value of the player's identity and public-key, which will be verified and authorized by the CA. In this case, $(\hat{A},A)$ and $(\hat{B},B)$ in the input of c,d,e can just be replaced by their hashed values already included in the certificates.

About reusing DH-components: In some scenarios, e.g., for online efficiency or for resistance against denial-of-service (DoS) attacks, the player may wish to reuse the same DH-components in multiple sessions within a reasonable (short) time period. To ease such DH-component reuses, as well as to strengthen the security of the protocol, one way is to put $r_{\hat{B}}$ (resp., $r_{\hat{A}}$) into the input of c (resp., d), and/or $(r_{\hat{A}},r_{\hat{B}})$ into the input of e, where $r_{\hat{A}}$ (resp., $r_{\hat{B}}$) is the random nonce sent by $\hat{A}$ (resp., $\hat{B}$). The sending of the random nonce $r_{\hat{A}}$ (resp., $r_{\hat{B}}$) can be together with or prior to or posterior to the sending of DH-component X (resp., Y) by $\hat{A}$ (resp., $\hat{B}$). This is a trick to make sure that even each player reuses its DH-components in multiple sessions, the session keys are still independent at random.

About mutual fairness: To provide fairness to the player who first sends ephemeral DH-component X, the player can require its peer to first send a commitment to the ephemeral DH-component Y (e.g., H(Y) where H is a hash function) before it sends X; after receiving X the peer then reveals the DH-component Y.

Client Privacy-Preserving and Server Dos-Resistant YYZ

Figure 3:
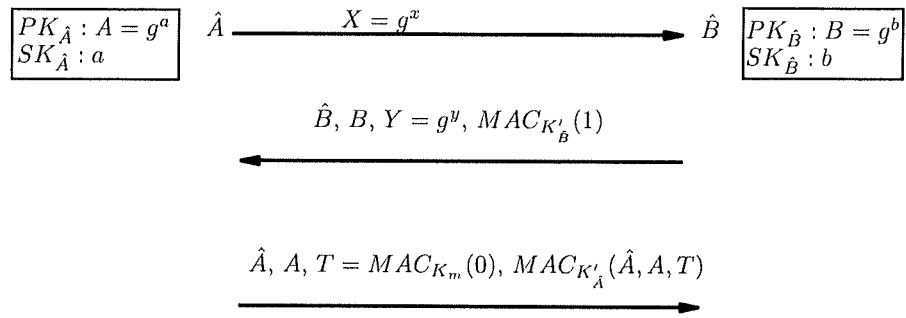
FIG. 3 shows YYZ as exemplarily embodied for the client-server setting 300, which renders deniability and post-ID computability and pre-computability to the client $\hat{A}$, the ability of resistance to denial-of-service attacks to the server $\hat{B}$, and mutual key confirmations to both parties.
Figure 7:
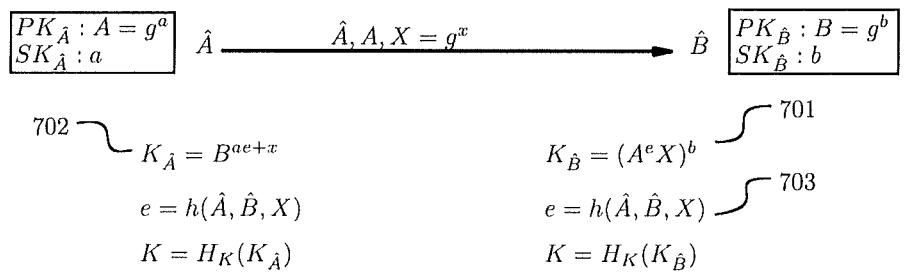
FIG. 7 shows an improved version of HMQV as exemplarily embodied in a one-pass key-exchange 700, where $K_{\hat{A}}$ is shown at 702, $K_{\hat{B}}$ s shown 701, and e is shown at 703.
Figure 8:
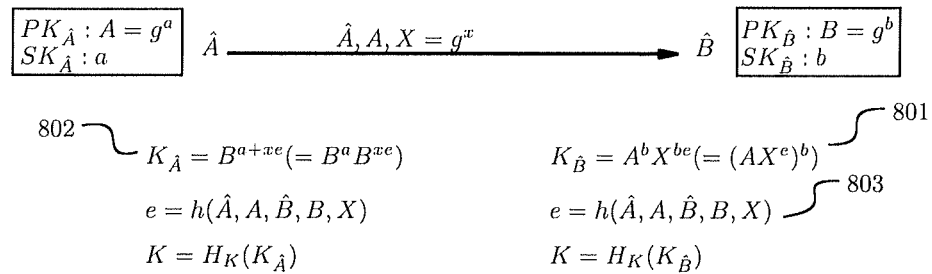
FIG. 8 shows YYZ as exemplarily embodied in a one-pass key-exchange 800, where $K_{\hat{A}}$ is shown at 802, $K_{\hat{B}}$ is shown at 801, and e is shown at 803.
Figure 9:
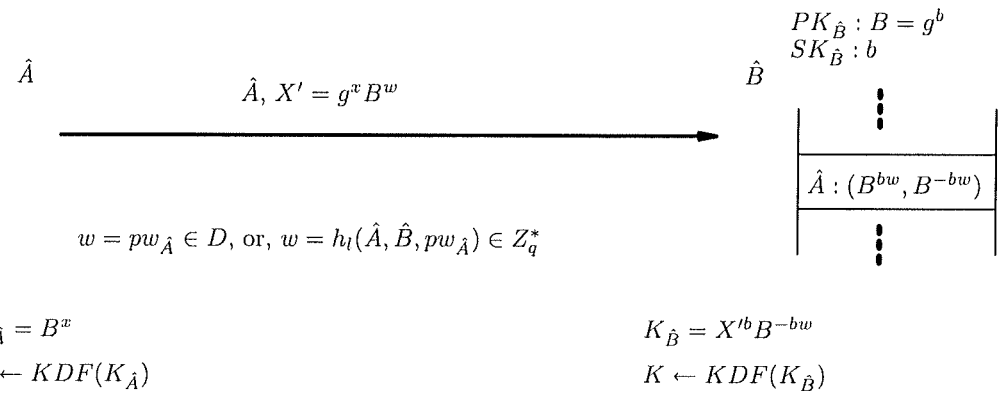
FIG. 9 shows an exemplary embodiment of the password-based DHKE protocol for the client-server setting 900.
Figure 10:
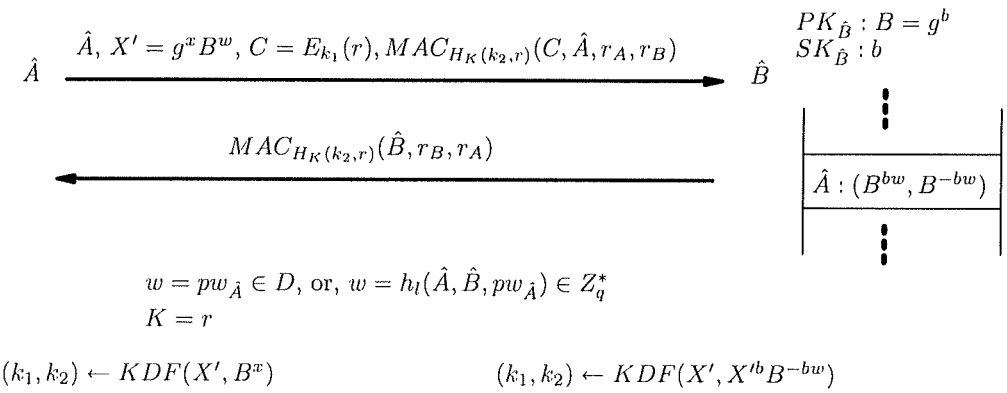
FIG. 10 shows an exemplary embodiment of 2-round DHKE protocols with mutual key-confirmations for the client-server setting 1000, using the password-based DHKE protocol shown in FIG. 9 and a public-key encryption scheme.
Figure 11:
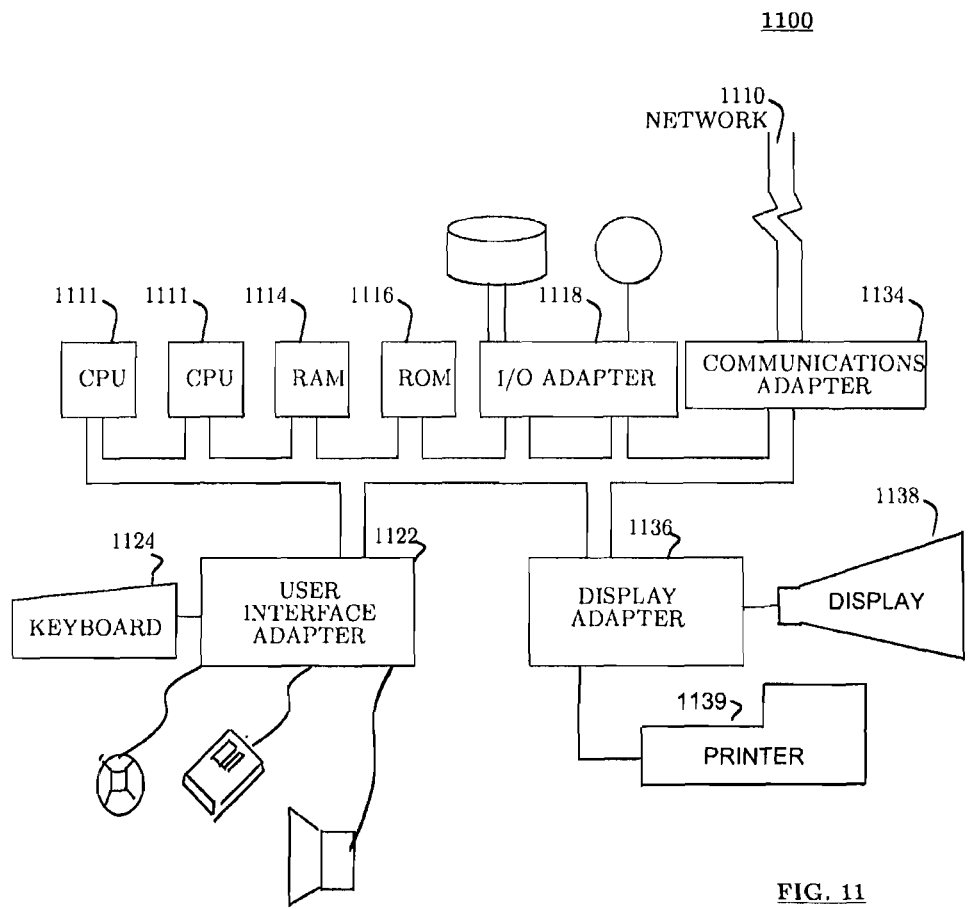
FIG. 11 illustrates an exemplary hardware/information handling system 1100 for incorporating the present invention therein, where the system 1100 includes CPUs 1111, a RAM 114, a ROM 1114, an I/O adapter 1118, a communications adapter 1134, a network 1110, a keyboard 1124, a user interface adapter 1122, a display adapter 1136, a display 1138, and a printer 1139.
Figure 12:
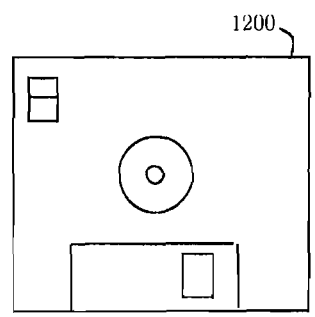
FIG. 12 illustrates a signal bearing medium 1200 (e.g., storage medium) for storing steps of a program of a method according to the present invention.

The inventors present a variant of the YYZ protocol in the distributed client-server setting, which is named as client-server YYZ (csYYZ). The rough protocol structure of csYYZ is depicted in FIG. 3. The csYYZ protocol variant can also be viewed as a good illustration of the instantiations of the general YYZ structure depicted in FIG. 6.

The following are the detailed description of the csYYZ protocol.

Round-1: The client (denoted $\hat{A}$) sends $X=g^x$ to the server (denoted B).

After receiving X, if $\hat{B}$ performs the explicit subgroup test it will abort in case $X \notin G'$. If $\hat{B}$ performs embedded subgroup test, $\hat{B}$ first verifies $X \in G'$ (and aborts if the verification fails), and then computes $X^{dbt+eyt}$, where $d=h(\hat{B},B,X)$, $e=h(X,Y)$ and $Y=g^y$ is the DH-component of $\hat{B}$. $\hat{B}$ verifies $X^{dbt+eyt} \neq 1_G$ (and aborts in case of verification failure). Then, $\hat{B}$ computes $K_{\hat{B}}'=H_K(X^{dbt+eyt})$, erases $X^{dbt+eyt}$ from the ephemeral private state (but keeps $K_{\hat{B}}'$ and y in secret), and moves to Round-2.

Round-2: $\hat{B}$ sends $\{Cert_{\hat{B}}, Y, t_{\hat{B}}'=MAC_{K_{\hat{B}}'}(1)\}$ to $\hat{A}$, where $Cert_{\hat{B}}$ is $\hat{B}$'s public-key certificate. $\hat{A}$ first verifies $Y \in G'$ (and aborts if the verification fails); $\hat{A}$ verifies the validity of $Cert_{\hat{B}}$ and aborts if the verification fails. Then, $\hat{A}$ does one of the following:

1) $\hat{A}$ computes $Y^{ext}$ and $Y^{cat}$ (and $Y^q$ in case for explicit sub-group test) in parallel (which amounts to about 1.2 exponentiations), checks that $Y^{ext} \neq 1_G$ or $Y^{cat} \neq 1_G$ (or $Y^q \neq 1_G$), and aborts in case any of the checks failures. $\hat{A}$ then computes $K_{\hat{A}}'=H_K(B^{dxt}Y^{ext})=K_{\hat{B}}'$, where $B^{dxt}$ can be pre-computed by $\hat{A}$ offline prior to the protocol run. Then, $\hat{A}$ verifies the validity of $t_{\hat{B}}'$ and aborts in case of verification failure. Finally, $\hat{A}$ computes the MAC-key $K_m=H_K(K_{\hat{A}}', Y^{act}, 0)$, and the session-key $K=H_K(K_{\hat{A}}', Y^{act}, 1)$.

2) $\hat{A}$ computes $B^{dxt}Y^{ext}$ (which amounts to 1.5 exponentiations), checks $B^{dxt}Y^{ext} \neq 1_G$ (in case for embedded sub-group test) and aborts in case of check failure, and then computes $K_{\hat{A}}'=H_K(B^{dxt}Y^{ext})=K_{\hat{B}}'$, $\hat{A}$ verifies the validity of $t_{\hat{B}}'$ and aborts in case of verification failure. Then, $\hat{A}$ computes $Y^{cat}$ (possibly and $Y^q$ in parallel in case for explicit sub-group test), where $c=h(\hat{A},A,Y)$, verifies $Y^{act} \neq 1_G$ (in case for embedded sub-group test) and aborts in case of verification failure. Finally, $\hat{A}$ computes the MAC-key $K_m=H_K(K_{\hat{A}}', Y^{act}, 0)$ and the session-key $K=H_K(K_{\hat{A}}', Y^{act}, 1)$ $\hat{A}$ computes $T=MAC_{K_m}(0)$ and $t_{\hat{A}}'=MAC_{K_{\hat{A}}'}(Cert_{\hat{A}}, T))$ or $t_{\hat{A}}'=MAC_{K_{\hat{A}}'}(\hat{A},T)$, where $Cert_{\hat{A}}$ is $\hat{A}$'s certificate. $\hat{A}$ keeps the session-key in secret, erases all other ephemeral private values generated within the protocol run, and moves Round-3.

The inventors remark that the ephemeral private values generated by $\hat{A}$ within the protocol run, which are potentially exposable to adversary, are: $(x, B^{dxt})$ in case of pre-computation of $B^{dxt}$, or just x without pre-computation of $B^{dxt}$. Other ephemeral private states are erased promptly after use. Note that all ephemeral private values generated by $\hat{A}$ within the protocol run, except for the session-key in case the session is successfully finished, are erased after the session is completed (whether finished or aborted), and for expired sessions the underlying session-keys are also erased.

Round-3: $\hat{A}$ sends $\{Cert_{\hat{A}}, T, t_{\hat{A}}'\}$ to $\hat{B}$ ($\hat{A}$ then finishes the session). After receiving the Round-3 messages, $\hat{B}$ first uses $K_{\hat{B}}'$ to verify the validity of $t_{\hat{A}}'$ (and aborts in case of verification failure). Then, $\hat{B}$ verifiers the validity of $Cert_{\hat{A}}$ (and aborts in case of verification failure). $\hat{B}$ then computes $A^{yct}$, computes the MAC-key $K_m=H_K(K_{\hat{B}}', A^{yct}, 0)$ and the session-key $K=H_H(K_{\hat{B}}', A^{yct}, 1)$ $\hat{B}$ verifies the validity of T (and aborts in case of verification failure). $\hat{B}$ keeps the session-key in secret, erases all ephemeral private values generated within the protocol run, and finishes the session. We remark that the ephemeral private values generated by $\hat{B}$ within the protocol run, which are potentially exposable to adversary, are: $\{y, K_{\hat{B}}'\}$. Other ephemeral private states are erased promptly after use. All ephemeral private values generated by $\hat{B}$ within the protocol run, except for the session-key in case the session is successfully finished, are erased after the session is completed (whether finished or aborted), and for expired sessions the underlying session-keys are also erased.

The csYYZ protocol enjoys the following advantageous features, which make the csYYZ protocol itself very attractive and being of independent interest:

1) Preserving client privacy: post-ID and zero-knowledge. Only after the server authenticates to the client, the client reveals its identity and authenticates itself to the server (i.e., the client works in the post-ID model). The interaction transcript of the protocol run is zero-knowledge (ZK) against possibly malicious server with arbitrary auxiliary input (that captures any arbitrary information collected by the server prior to the protocol run). The ZK property is from the following observations: (1) The transcript of the protocol run can be generated merely from the DH-exponents (x,y) without using either the static secret-key a or b; (2) Before the client $\hat{A}$ sends the authentication message at Round-3, the server has proved it knowledge about y by $t_{\hat{B}}'$, at Round-2 via the underlying building tool SSJPOK.

2) Server capability of denial-of-service (DoS) resistance, and reasonable deniability. The server $\hat{B}$ can perform only one on-line exponentiation, i.e., $K_{\hat{B}}'$, to detect and resist against potential DoS attacks. Note that Y can be pre-computed and can be reused in multiple sessions in case of facing DoS attacks; Also note that $\hat{B}$ computes $A^{cy}$ and verifies the validity $Cert_{\hat{A}}$ only after verifying the validity of $t_{\hat{A}}'$ (that does not need performing additional exponentiations). The reasonable deniability to $\hat{B}$ is still from the observation: the transcript of the protocol run can be generated merely from the DH-exponents (x,y) without using either the static secret-key a or b.

3) Nearly optimal (online) efficiency: $\hat{B}$ performs 3 exponentiations in total. $\hat{A}$ performs about 3.5 exponentiations in total with the computation $K_{\hat{B}}'=B^{dxt}Y^{ext}$, or, about 3.2 exponentiations in total with the computation of $Y^{ext}$ and $Y^{cat}$ in parallel. As the computation of $B^{dxt}$ and DH-components can be pre-computed offline, the on-line efficiency of csYYZ can be 1.2 exponentiations for $\hat{A}$ and 2 exponentiations for $\hat{B}$. Also, note that in case $\hat{B}$ knows $\hat{A}$'s identity prior to the protocol run, the online efficiency of $\hat{B}$ is just one exponentiation (as $A^{cyt}$ can also be pre-computed by $\hat{B}$ in this case).

Notes on another (natural) implementation of csYYZ: For better compatibility with other variants of YYZ, one natural implementation of the csYYZ protocol is to derive the MAC-key and the session-key from the same shared DH-secret as YYZ (depicted in FIG. 2). For example, the MAC-key and the session-key are set to be: $K_m = H_K(K_{\hat{A}}, 0) = H_K(K_{\hat{B}}, 0)$ and $K = H_K(K_{\hat{A}}, 1) = H_K(K_{\hat{B}}, 1)$, where $K_{\hat{A}} = B^{xtd}Y^{act+xte}$ and $K_{\hat{B}} = A^{ytc}X^{btd+yte}$ are the same as YYZ (depicted in FIG. 2, 206 and 207).

For this natural implementation of csYYZ, it has the following disadvantages (in spite of the above compatibility advantage): (1) It is more inefficient, specifically, each player needs to perform one additional multiplication to compute out the MAC-key and the session-key; (2) The server, i.e., $\hat{B}$, may demand a more careful or involved management of its ephemeral private state, whose exposure can violate the TBRNM security (in accordance with the YYZ framework). This subtlety is further addressed below.

Note that for this natural implementation of csYYZ, the ephemeral private values kept by $\hat{B}$ within the protocol run, which are possibly exposable to adversary, are $(y, X^{btd+yte})$. The inventors show that the exposure of $(y, X^{btd+yte})$ can violate the TBRNM security, by demonstrating a concrete attack. For presentation simplicity, it is assumed that t=1 in the following attack description. Specifically, suppose a CMIM adversary Д interacts with $\hat{A}$ as the responder in the name $\hat{M}_1$ in a session (referred to as the test-session), and concurrently interacts with $\hat{B}$ as the initiator in the name of $\hat{M}_2$ in another session (referred to as the second-session). After receiving X from $\hat{A}$ in the first session, Д forwards X to $\hat{B}$ in the second-session. In case the ephemeral private values $(y, X^{d_2 b+e_{hu}y})$ kept by $\hat{B}$ (for the second-session) are composed to Д, Д can compute out $X^b = (X^{d_2 b + e_2 y}/X^{e_2 y})^{d_2^{-1}}$, where $d_2 = h(\hat{B}, B, X)$ and $e_2 = h(X, Y)$. Now, the adversary Д has two strategies:

(1) Д sets $\hat{M}_1 = \hat{B}$ (and thus the public-key of $\hat{M}_1 = \hat{B}$ is B), generates and sends $Y' = g^{y'}$ to A in the second-round of the test-session (note that Д knows the DH-exponent y'); Then, Д uses $X^b$ and y' to compute out the session-key of the test-session, while without knowing the static secret-key b.

(2) Д sends B as its DH-component in the second-round of the test-session (but generates the public-key of $\hat{M}_1$ honestly), and furthermore suppose Д also learns the static secret-key a of $\hat{A}$, Д can then successfully finish the test-session but without knowing the DH-exponent b in this case.

Note that, in any of the above two cases, the test-session is still internally-unexposed, and the internally-exposed second-session is not the matching session of the test-session (as $Y' \neq Y$ in the first case and $Y \neq B$ in the second case), and thus the above attacks do not violate the definition of TBRNM. The underlying reason beneath such attacks is: the leakage of the ephemeral values of both y and $X^{d_2 b + e_2 y}$ can render a CDH solver oracle, say $X^b$, to the adversary.

More Variants of YYZ

The inventors present and clarify a list of some other seemingly (maybe unreasonably) weak variants, which further highlight the advantages of the YYZ protocol, its careful design and sound design rational.

$K_{\hat{A}} = B^{fa+dx}Y^{ca+ex}$ and $K_{\hat{B}} = B^{fb+cy}Y^{db+ey}$, where $c = h(\hat{A}, A, Y)$, $d = h(\hat{B}, B, X)$, $e = h(X, Y)$ and. $f = 1$ This variant has the following weaknesses: (1) It can lose the TBRNM security when the values $A^b$ or $B^a$ is pre-computed. Specifically, suppose a concur-rent man-in-the-middle (CMIM) adversary Д interacts with $\hat{A}$ as the responder in the name $\hat{M}_1$ in a session (referred to as the test-session), and concurrently interacts with $\hat{B}$ as the initiator in the name of $\hat{M}_2$ in another session (referred to as the second-session). After receiving X from $\hat{A}$ in the first session, Д registers X as the public-key of $\hat{M}_2$ in the second-session. In case both of the ephemeral private values y and $X^{b+cy}$ (pre-computed by $\hat{B}$ in the second-session) are composed to Д, Д can compute out $X^b = X^{b+cy}/X^{cy}$, where $c = h(\hat{M}_2, X, Y)$. Now, further suppose Д also learns the static secret-key a of $\hat{A}$, Д can then successfully impersonate the player $\hat{B}$ (i.e., $\hat{M}_1 = \hat{B}$) in the test-session but actually without knowing the secret-key b (to this end, Д will generate the DH-component honestly in the test-session). Note that the test-session is still internally-unexposed, and the internally-exposed second-session is not the matching session of the test-session, and thus the above attack does not violate the definition of TBRNM. It is interesting to note that, though the variant provides seemingly stronger security than that of the original YYZ, it actually can weaken the security besides complicating the protocol and reducing efficiency. The inventors remark that the underlying reason beneath such attacks is: the leakage of the ephemeral values of both y and $X^{b+cy}$ can render a CDH solver oracle, say $X^b$, to the adversary. This attack can be prevented by explicitly requiring POK/POP during key registration. (2) Another weakness of the variant is: if $\hat{B}$ sets $Y = A$ and $B = (Y^c X^e)^{-1}$ then $K_{\hat{B}} = X^{db}$. This weakness can be prevented by setting $f = h(\hat{A}, A, \hat{B}, B)$, but at the price of sacrificing the advantage of pre-computability and modular computability (specifically, the players have to make sure their roles, initiator or responder, before computing $f$).

$K_{\hat{A}} = B^{dxt}Y^{cat}$ and $K_{\hat{B}} = A^{cyt}X^{dbt}$, where $c = h(\hat{A}, A, Y)$ and $d = h(\hat{B}, B, X)$ (of course, other values of c, d are possible as long as the union of the inputs cover the tag, e.g., $c = 1$ and $d = h(\hat{A}, A, \hat{B}, B, X, Y)$ or, $c = h(\hat{A}, A, \hat{B}, B, Y)$ and $d = h(\hat{B}, B, \hat{A}, A, X)$). The weaknesses of these protocol variants are: (1) If both of the static secret-key, a and b, are leaked, session-keys of previous sessions can be derived. That is, they lose the perfect forward security (PFS); (2) If $\hat{B}$ sets $B = A$, then $K_{\hat{A}} = K_{\hat{B}} = A^{dxt+cyt}$. If the static secret-key a is leaked, the attack can compute out $K_{\hat{A}} = K_{\hat{B}}$ without knowing the DH-exponent y or x. The inventors note this variant can be used to partially fix the flaws of the DHKE protocol (Cryptology ePrint Archive 2007/116, available from http://eprint.iacr.org/2007/116), caused by the value $h(g^{ay}g^{xb})$ as clarified in Cryptology ePrint Archive 2007/191.

$K_{\hat{A}} = B^{a+x}Y^{a+ex}$ and $K_{\hat{B}} = A^{b+y}X^{b+ey}$, where $e = h(\hat{A}, A, \hat{B}, B, X, Y)$ This variant has the following weaknesses: (1) If the player $\hat{B}$ sets $Y = B^{-1}$, then $K_{\hat{B}} = X^{b-ey} = X^{b(1-e)}$; (2) If the player $\hat{B}$ sets $Y = (BX)^{-1}$ (i.e., $y = -b-x$) and $B = A$, then $K_{\hat{B}} = A^{b+y}X^{b+ey} = X^{ey}$. One remedy for the above weaknesses is: $K_{\hat{A}} = B^{fa+x}Y^{a+ex}$ and $K_{\hat{B}} = A^{fb+y}X^{b+ey}$, where $e = h(\hat{A}, A, \hat{B}, B, X, Y)$ and $f = h(X, Y, \hat{A}, A, \hat{B}, B)$. But, this remedy sacrifices the advantage of on-line efficiency of YYZ.

$K_{\hat{A}} = B^{dxt}Y^{cat+ext}$ and $K_{\hat{B}} = A^{cyt}X^{dbt+eyt}$, where $c = h(\hat{B}, B, Y)$, $d = h(\hat{A}, A, X)$, $e = h(X, Y)$. This variant has the following weakness: if $\hat{B}$ sets $B = Y^{-e/d}$ (i.e., $b = -y(e/d)$) then $K_{\hat{B}} = A^{cyt}X^{dbt+eyt} = A^{cyt}$; in case of the leakage of a, $\hat{B}$ can finish the session without knowing either y or b. Though such weakness can be remedied by setting $e = h(\hat{A}, A, \hat{B}, B, X, Y)$, this remedied variant loses the advantage of modular and post-ID computability of YYZ. Similarly, we can also strengthen the YYZ protocol (depicted in FIG. 2) for seemingly (unjustified) stronger robustness by setting $e=h(\hat{A},A,\hat{B},B,X,Y)$ but at the price of sacrificing the advantage of modular and post-ID computability of YYZ.

$K_{\hat{A}}=B^{dxt}Y^{cat+ext}$ and $K_{\hat{B}}=A^{cyt}X^{dbt+eyt}$, where $c=h(\hat{A},Y)$, $d=h(\hat{B},X)$, $e=h(X,Y)$ or $e=h(\hat{A},A,\hat{B},B,X,Y)$. This is the variant of YYZ, where player's public-key A (resp., B) is removed from the input of c (resp., d). The weaknesses of this variant of YYZ are: (1) If $\hat{B}$ sets $Y=X$ and $B=A^{-c/d}$ (i.e., $b=-ac/d$), then $K_{\hat{B}}=A^{cyt}X^{dbt+eyt}=X^{eyt}$. This weakness can be remedied by requiring POK/POP for public-key registrations; (2) If $\hat{B}$ sets $B=g^{d^{-1}}$, then $K_{\hat{B}}=A^{cyt}X^{dbt+eyt}=A^{cyt}X^{t+eyt}$; (3) if $\hat{B}$ sets $Y=X$ and $B=g^{d^{-1}}/A^{c/d}$ (i.e., $b=d^{-1}-a(c/d)$), then $K_{\hat{B}}=A^{cyt}X^{dbt+eyt}X^{t+eyt}$, furthermore, if $e=h(X,Y)$ (or any other values independent of B), $\hat{B}$ can set $Y=X$ and $B=g^{d^{-1}}/A^{c/d}Y^{e/d}$ and in this case $K_{\hat{B}}=X'$. The weaknesses (2) and (3) cannot be remedied by POK/POP of key-registration, but can be remedied if the player $\hat{A}$ makes sure that its peer's public-key B is fixed before sending its DH-component X, which however may limit the deployments in certain scenario (e.g., in the post-ID model for preserving player's privacy). The inventors remark that the variants of rYYZ and sYYZ, when public-keys are removed from c, d and/or e, suffer from the similar weaknesses.

$K_{\hat{A}}=B^{dxt}Y^{cat+ext}$ and $K_{\hat{B}}=A^{cyt}X^{dbt+eyt}$ where $c=h(Y)$, $d=h(X)$, $e=h(X,Y)$. This is the variant of YYZ, where both player's identity and public-key $(\hat{A},A)$ (resp., $(\hat{B},B)$) are removed from the input of c (resp., d). Besides above clarified weaknesses, such variant additionally has the following weaknesses (the variants of rYYZ and sYYZ, when player's identities are removed from c,d and/or e, suffer from the similar weaknesses): (1) Unknown key share (UKS) attack: with this variant, the session-key is not adhere to the tag of the session. Consider a man-in-the-middle adversary, who impersonates to $\hat{A}$ as $\hat{B}'(\neq\hat{B})$ but of same public-key B and simultaneously impersonates to $\hat{B}$ as $\hat{A}'(\neq\hat{A})$ but of the same public-key A, then the adversary can set two sessions of different tags to be of the same session-key. This weakness can be remedied by putting players' identities $(\hat{A},\hat{B})$ into the input of key-derivation function, and/or requiring POK/POP of key registration. (2) Weakness against secrecy leakage. Suppose the ephemeral private value $X^{dbt+eyt}$ (generated and kept by $\hat{B}$, e.g., when $\hat{A}$ works in the post-ID model as in csYYZ) and $\hat{A}$'s secret-key a are exposed to the adversary, then the adversary can successfully finish the session with $\hat{A}$ in the name of $\hat{B}$ but without knowing either b or y. Such weakness can weaken the tag-based robust non-malleability, specifically, reduce the security from tag-binding TBRNM to privacy-preserving TBRNM. This weakness can be remedied by requiring $\hat{B}$ not to pre-compute $X^{dbt+eyt}$, but may limit the protocol deployments.

Some other useful variants are: (1) The function e in YYZ is set to be $h(\hat{A},A,\hat{B},B,X,Y)$ or $h(\hat{A},\hat{B},X,Y)$. This variant loses the post-ID and modular computability of YYZ; (2) In YYZ, the function c is set to be $h(\hat{B},\hat{A},A,Y)$ and/or d is set to be $h(\hat{A},\hat{B},B,X)$; (3) The function e in rYYZ is just set to be H(X,Y), and/or the function c is set to be $h(\hat{A},A,Y)$ and d is set to be $h(\hat{B},B,X)$. Such variant may impair the strong TBRNM security of rYYZ, particularly its robust resistance against ephemeral secrecy leakage.

General YYZ: Let each $pub_i, 1\leq i\leq 4$, be a (maybe empty) subset of other messages, except for the DH-components (X,Y), related to the run of Diffie-Hellman key-exchange, which typically include: players identity information, public-keys, session-identifier, random nonces, players' network addresses, etc. Then, all the above variants, and YYZ and rYYZ and sYYZ, are all carefully instantiated from the following general protocol structure, called general YYZ (needless to say, some instantiations of the general YYZ structure may be weak and even insecure):

$K_{\hat{A}}=B^{fa+dxt}Y^{cat+ext}$ and $K_{\hat{B}}=A^{fb+cyt}X^{dbt+eyt}$, the session-key is $K=H_K(K_{\hat{A}})=H_K(K_{\hat{B}})$, where $c=h(pub_1,Y)$ or $c=1$, $d=h(pub_2,X)$ or $d=1$, $e=h(pub_3,X,Y)$ or $e=0$. $f=0$ for full deniability, $f=1$ or $f=h(pub_4)$ or $f=h(X,Y,pub_4)$ for group deniability. It is recommended that the input of c includes $\hat{A}$, the input of d includes $\hat{B}$, when $c=d=1$, e cannot be 0 and the input of e should include $(\hat{A},\hat{B})$. In case CA does not perform the sub-group test for registered public-keys, $fa$ and $fb$ should also be multiplied by t.

Advantageous Features of YYZ

The inventors highlight some advantageous features of the YYZ protocol (depicted in FIG. 2, 206 and 207), in comparison with the (H)MQV protocol family (depicted in FIG. 2, 201, 202 and 203).

Essentially optimal (on-line) efficiency: The computational complexity of YYZ is essentially the same as that of (H)MQV: each player performs about 1.5 exponentiations, besides the DH-component computation and sub-group test. Note that the computation of $K_{\hat{A}}=B^{dxt}Y^{cat+ext}$ (resp., $K_{\hat{B}}=A^{cyt}X^{dbt+eyt}$) accounts for about 1.5 exponentiations. One key advantageous feature of YYZ is its essentially optimal on-line efficiency. Specifically, the player $\hat{A}$ can pre-compute X and $B^{dbx}$, and the player $\hat{B}$ can pre-compute Y and $A^{cyt}$. Thus, the online complexity is just one exponentiation for each player, besides the subgroup test of peer's DH-component that however can be embedded without performing exponentiation. Note that the on-line complexity of (H)MQV is at least 1.5 exponentiations (without the sub-group test).

Parallel, modular and post-ID computability: $B^{dxt}$ and $Y^{cat+ext}$ and the explicit sub-group test $Y^q$ by $\hat{A}$, respectively $A^{cyt}$ and $X^{dbt+eyt}$ and $X^q$ by $\hat{B}$, can be computed in a parallel, modular and post-ID way, which much eases the YYZ protocol deployments in various scenarios.

Specifically, the parallel computation of $Y^{cat+ext}$ and $Y^q$ (resp., $X^{dbt+eyt}$ and $X^q$) amounts to 1.2 exponentiations; the computation of $K_{\hat{A}}=B^{dxt}Y^{cat+ext}$ (resp., $K_{\hat{B}}=A^{cyt}X^{dbt+eyt}$) accounts for about 1.5 exponentiations. More importantly, observe that $Y^{cat+ext}$ (resp., $X^{dbt+eyt}$) can be computed before learning peer's identity and public-key information. This post-ID computability is remarkable for preserving players' privacy. The advantage of the parallel, modular and post-ID computability is particularly demonstrated by the foregoing privacy-preserving (zero-knowledge and post-ID computability for the client) and DoS-resistant (for the server) csYYZ protocol variant for the distributed client-server setting. The inventors note that the (H)MQV protocol family does not enjoy all these advantageous properties, particularly the post-ID computability.

Deniability: The session-key of YYZ can be computed out merely from the DH-exponents x and y (without involving any player's static secret-key a or b). Specifically, $K_{\hat{A}}=K_{\hat{B}}=A^{cy}B^{dx}g^{xy}$. This renders reasonable and useful deniability privacy to protocol players. Furthermore, for the 3-round YYZ, the initiator $\hat{A}$ is perfectly deniable against concurrent adversary $\hat{B}$ of arbitrary auxiliary input. Specifically, the transcript of the concurrent run of the three-round version YYZ (between the concurrent adversary $\hat{B}$ and the instances of the honest $\hat{A}$) can be efficiently simulated by a simulator (by running $\hat{B}$ as a subroutine), by the assumption related to SSJPOK in the RO model, i.e., the fresh-challenge joint-knowledge-of-exponents (JKEA) assumption that is an extension of the fresh-challenge KEA assumption (clarified by Yao et al in Cryptology ePrint Archive No. 2007/191). The inventors note (H)MQV does not enjoy such deniability privacy advantage.

Robust security: Firstly, the YYZ protocol and (H) MQV are designed with fundamentally different tools: YYZ is designed with the self-sealed joint-POK (SSJPOK), introduced and justified herein, which the inventors believe is fundamental, of independent value and wide applications, The design of (H) MQV is based on exponential challenge-response (XCR) signatures, and the design of MQV is based on implicit signatures. Secondly, YYZ and (H) MQV are designed with fundamentally different guiding principles. YYZ is designed for the tag-based robust non-malleability (TBRNM) security goal in accordance with the YYZ framework for DHKE, with the philosophy of achieving security as robust as possible while relying on secrecy as minimal as possible. Specifically, a party completing a session (of distinct tag) has the guarantee that, as long as the session is not internally-exposed, its peer (whether honest or malicious) must "know" both the according DH-exponent and the secret-key (corresponding to the DH-component and public-key sent and alleged by the peer). Note that, as demonstrated in the foregoing re-examination of (H)MQV, (H)MQV does not achieve so robust security guarantee in general. (H)MQV was analyzed according to the session-key security (SK-security) in the Canetti-Krawczyk framework, which is essentially weaker than the TBRNM in accordance with the YYZ framework. Arguably, the inventors suggest the underlying building tool and design principle of YYZ should be more sound and solid than those of (H)MQV, particularly in view of the evolution history of (H)MQV.

Minimal setup and easy deployment: YYZ does not mandate POP/POK for key registration, while POK/POP is now commonly assumed for MQV (note that (H)MQV without POK/POP can lose the TBRNM security in general as demonstrated in the foregoing re-examination of (H)MQV). YYZ can work with generic groups for which the CDH or decisional DH (DDH) assumptions hold (while MQV does not). The features of pre-computability, parallel, modular and post-ID computability also much ease the protocol deployments of YYZ, allowing for various trade-off among security, privacy and efficiency in various application scenarios. Finally, note that the YYZ protocol is of perfect compatibility with (H)MQV (in particular, they can have the same security parameters).

Other notable advantageous features: The design rational of YYZ is of conceptual simplicity, the protocol structure is of simplicity, and the computation is symmetrical.

Security Notes of the YYZ Protocol Family

The inventors briefly demonstrate herein the TBRNM security of (the three-round version of) the YYZ protocol, with respect to the test-session of an malicious $\hat{B}$ against an honest $\hat{A}$.

To successfully finish the test-session, no matter what adversarial strategies are employed by the malicious $\hat{B}$, $\hat{B}$ has to compute out three independent DH-secrets: $A^{cy}$, $X^{db}$ and $X^{ey}$, As A is independent from (i.e., cannot be made maliciously correlated to) $X^{db}$ and $X^{ey}$, to successfully finish the test-session, the malicious $\hat{B}$ has to compute out the two independent DH-secrets $X^{db}$ and $X^{ey}$ w.r.t. the fresh random challenge X. As the random challenge X is fresh, the arbitrary auxiliary input possessed by the malicious $\hat{B}$, which captures arbitrary information collected/eavesdropped by $\hat{B}$ over the network from the executions of arbitrary (possibly different) protocols prior to its interactions with the instances of YYZ, does not help the malicious $\hat{B}$ to compute $X^{db}$ and A'. On the other hand, the CMIM attacks against the concurrent run of YYZ (allowed by the YYZ framework) also do not render any CDH solver oracle to the malicious B. In particular, the exposable ephemeral private values do not render the adversary any additional advantages other than what can be derived merely from the according ephemeral DH-exponents (and thus no CDH solver oracle is rendered). By the fresh-random challenge Knowledge-of-Exponent assumption (KEA) against CMIM of arbitrary auxiliary input, clarified by Yao, et al (Cryptology ePring Archive, No. 2007/191), this implies that the malicious $\hat{B}$ has to "know" both b and y to successfully finish the test-session. In a sense, the SSJPOK (on which the security of YYZ is based) can be viewed as a new assumption, named "fresh-challenge joint-knowledge-of-exponents (JKEA) assumption against CMIM of arbitrary auxiliary input". The inventors believe that SSJPOK is itself of independent value, and can find its applications in many other (DH-based) applications.

But, one should beware of some inherent security limitations for any one-round and two-round implicitly-authenticated DHKE protocols, e.g., the perfect forward security (PFS) vulnerability for two-round implicitly-authenticated DHKE and the key-compromise impersonate (KCI) vulnerability for one-round implicitly-authenticated DHKE. Even for the three-round version of YYZ (as well as HMQV), there are also some inherent limitations. For example, the protocol responder may not be able to get deniability in a fair way, in case the malicious protocol initiator just aborts after receiving the second-round message, Also, both the three-round YYZ and (H)MQV suffer from the cutting-last-message attack, etc. The inventors remark that losing deniability fairness to protocol responder and lacking correct delivery guarantee of the last message are inherent to the protocol structure of YYZ and (H) MQV and do not violate the definition of TBRNM (that holds for successfully finished internally-unexposed sessions of distinct tags and does not consider deniability privacy), which though can be easily remedied but at the price of ruining the performance advantages.

Note on the security of sYYZ: sYYZ is designed with the simple SSJPOK, and is of minimal use of random oracles. But, the inventors did not try to claim the tag-based robust non-malleability security of sYYZ, for the following observation: the values $A^y=Y^a$ and $X^b=B^x$ in $K_{\hat{B}}$ and $K_{\hat{A}}$ are not independent and thus can be potentially made maliciously correlated.

Consider the following weakness: if $\hat{B}$ sets $Y=X^{-1}$ and B=A (resp., Y=X and $B=A^{-1}$), then $K_{\hat{B}}=X^{-ext}$ (resp., $K_{\hat{B}}=X^{ext}$); Then, if the DH-exponent x is leaked (from which y is derived), $\hat{B}$ can finish without knowing b (that is a or −a). But, this unreasonable weakness does not violate the tag-based robust non-malleability, as the ephemeral DH-exponent x is leaked to the adversary (i.e., the session is internally-exposed). Rather, it is shown that, assuming x is unexposable, this concrete vulnerability makes no damage under the CDH assumption. Specifically, supposing x is unexposed, the security of sYYZ with the above concrete attacks is reduced to the hardness of computing out $X^x$ given a randomly generated $x=g^x$. It is shown that the hardness of this problem is equivalent to that of the traditional CDH assumption. The inventors suggest sYYZ is still reasonably secure, but the inventors did not try to claim the TBRNM security for it.

Note on the security of rYYZ: It is true that rYYZ when $f=0$ provides the security as strong as that of the YYZ protocol, at the price of sacrificing the advantage of post-ID and modular computability. But, for rYYZ when $f=1$, the situation is a bit subtler. The inventors show rYYZ with $f=1$ can lose the TBRNM security, when the values $A^b$ or $B^a$ is pre-computed.

Specifically, suppose a CMIM adversary Д interacts with Â as the responder in the name $\hat{M}_1$ in a session (referred to as the test-session), and concurrently interacts with B̂ as the initiator in the name of $\hat{M}_2$ in another session (referred to as the second-session). After receiving X from Â in the first session, Д registers X as the public-key of $\hat{M}_2$ in the second-session. In case both of the ephemeral private values y and $X^{b+cyt}$ (pre-computed by B̂ in the second-session) are composed to Д, Д can compute out $X^b = (X^{b+cyt}/X^{cyt})$, where $c=h(\hat{M}_2,X,Y)$). Now, further suppose Д also learns the static secret-key a of Â, Д can then successfully impersonate the player B̂ (i.e., $\hat{M}_1 = \hat{B}$) in the test-session but actually without knowing the secret-key b (to this end, Д will generate the DH-component honestly in the test-session). That is, in this case, Д computes $K_{\hat{M}_1} = K_{\hat{B}} = A^{b+cyt}X^{dbt+eyt} = B^a A^{cyt} (X^b)^{db}X^{eyt}$ using the knowledge $(a,y,X^b)$ but without knowing b.

Note that the test-session is internally-unexposed and can be of distinct tag, and thus the above attack does not violate the definition of TBRNM. It is interesting to note that, though rYYZ with $f=1$ seems to provide stronger security than that of the original YYZ, it actually can weaken the security besides complicating the protocol complexity and reducing efficiency. The inventors remark that the underlying reason beneath such attacks is: the leakage of the ephemeral values of both y and $X^{b+cyt}$ can render a CDH solver oracle, say $X^b$, to the adversary. This concrete attack can be prevented by explicitly requiring POK/POP during key registration. The inventors remark that the POP/POK, or special care of ephemeral private values, for rYYZ with $f=1$ and pre-computation of $A^{fb+cy}$ and/or $B^{fa+dx}$ is only against the powerful adversary who can expose both the static secret-key of Â and the ephemeral private values of B̂. Without exposing either of them, the above demonstrated attack will fail. The same phenomenon also applies to (H)MQV, if both the DH-exponent and the value $K_{\hat{A}}$ or $K_{\hat{B}}$ are exposable and the adversary also exposes the static secret-key of the uncorrupted player Â or B̂.

Applications of SSJPOK to Secure Shell (SSH)

The Secure Shell (SSH) is a public-key based authentication protocol suite, which enables a user to securely login onto a remote server host machine from a client machine through an insecure network, to securely execute commands in the remote host and to securely move files from one host to another. The protocol is a de facto industrial standard and is in wide use for server machines of running UNIX and Linux operating systems and client machines of running any operating systems.

The SSH protocol suite consists of three protocols: (1) the SSH Transport Layer (SSH/TL) protocol (by Ylonen, INTERNET-DRAFT, draft-ietf-architecture-13.txt, 2002), which provides a unilateral authenticated secure channel from the server to the client, (2) The SSH User Authentication (SSH/UA) protocol, which provides unilateral authenticated secure channel from the client to the server, (3) The SSH Connection Protocol, which runs over the mutually authenticated secure channel established by the above two protocols.

The core authentication protocol of the present SSH/TL protocol (of Ylonen, 2002) is: Â (i.e., the client) sends $X=g^x$ to the server B̂, and the server B̂ (of public-key B) responds with $\{sid,B,Y=g^y,Sig_{\hat{B}}(H(sid,B,X,Y,X^y))\}$, where sid is the session identifier (which is normally the concatenation of two exchanged random nonces), $Sig_{\hat{B}}(H(sid,B,X,Y,X^y))$ denote the signature by B̂ on message $H(sid,B,X,Y,X^y)$, and H is a cryptographic hash function (e.g., SHA-1). The session-key is derived from $g^{xy}$.

Suppose the signature is generated using the Digital Signature Standard (DSS), which is the common case now in practice, the computational complexity at the side of the player Â (i.e., the client) is about 3.5 exponentiations, and about 3 exponentiations at the side of the player B̂ (i.e., the server). Note that, besides the DH-components X and Y, the players cannot pre-compute or verify the signature and the session-key offline, that is, the on-line computational complexity at the side of the player Â is about 2.5 exponentiations, and about 2 exponentiations at the side of the player B̂. For communication complexity, beside other necessary transmission, the length of the DSS signature (i.e., $Sig_{\hat{B}}(H(sid,B,X,Y,X^y))$) is 2|q|.

The inventors note that the SSJPOK and sSSJPOK, developed in the present invention, can be directly applied to SSH/TL in this case. Specifically, let $K_{\hat{B}} = X^{dbt+eyt} = B^{dxt}Y^{ext} = K_{\hat{A}}$, where $d=h(\hat{B},B,X)$ and $e=h(sid,X,Y)$, or, $d=1$ and $e=h(sid,\hat{B},B,X,Y))$. Note that, to preserve its privacy, the client Â may not reveal its identity in the first-round, which is thus not included in the input of d and e (of course, if Â's identity is revealed in the first round, it can be put into the input of d or e). Let $(k_1,k_2)$ be the key pair derived from $K_{\hat{A}} = K_{\hat{B}}$ (or from (sid, $K_{\hat{A}} = K_{\hat{B}}$) in case sid is not put into the input of e). Then, the second-round message of the above SSH/TL is replaced by $\{sid,B,Y=g^y,MAC_{k_2}(1)\}$, and the session-key is defined to be $k_1$.

For the computational complexity of the SSJPOK-based SSH/TL protocol, if the player B̂ explicitly checks $X^q=1_G$ (i.e., performs explicit subgroup test), then the computational complexity at the side of B̂ is about 2.2 exponentiations, or just 2 exponentiations with embedded sub-group test (in this case it is recommended for B̂ to well protect the ephemeral DH-exponent y). As Y can be pre-computed offline, the online efficiency of B̂ is 1.2 exponentiations with explicit sub-group test or just 1 exponentiation with embedded sub-group test. For the computational complexity at the side of Â, it is about 2.5 exponentiations in total, but the on-line efficiency can be only 1 exponentiation (specifically, X and $B^{dxt}$ can be computed offline). This indicates significant (online) efficiency improvements, in comparison with the DSS-based implementation of SSH/TL. In particular, the online efficiency of SSJPOK-based SSH/TL is essentially optimal. Further note that the length of $MAC_{k_2}(1)$ is |q|, which also improves the communication complexity of the DSS-based SSH/TL.

Certificateless YYZ (clYYZ)

Let $\hat{e}:G_1 \times G_1 \to G$ be an admissible pairing, where $G_1$ is a cyclic additive (or multiplicative) group of the order q generated by an element P, and it is assumed that the discrete logarithm problem (DLP) assumption holds w.r.t. both $G_1$ and G (i.e., given an element xP or $g^x$ for x randomly taken from $Z_q^*$ no probabilistic polynomial-time algorithm can output x with non-negligible probability, where the probability is taken the random coins of the algorithm and the random coins used to select x). Here, an admissible pairing satisfies the following three properties:

1) Bilinear: If $P,Q \in G_1$, and $x,y \in Z_q^*$, then $\hat{e}(xP,yQ) = \hat{e}(P,Q)^{xy}$.

2) Non-degenerate: There exists a $P \in G_1$ such that $\hat{e}(P,P) \neq 1_G$.

3) Computable: If $P,Q \in G_1$, one can compute $\hat{e}(P,Q)$ in polynomial-time.

Let $H_1:\{0,1\}^* \to G_1$ be a hash function, The public-key of the trusted Private Key Generator (PKG) is: $PK_{PKG}=sP$, where s is randomly taken from $Z_q^*$, The public-key of the player Â is $(A,Q_A)$, and its secret-key is $(a,sQ_A)$, where $Q_A=H_1(\hat{A},A)$ or $Q_A=H_1(\hat{A})$ and $sQ_A$ is generated by the PKG and is sent to Â securely; The public-key of the player B̂ is (B,$Q_B$) and its secret-key is (b,$sQ_8$), where $Q_B H_1(\hat{B},B)$ or $Q_B=H_1(\hat{B})$ and $sQ_8$ is generated by the PKG and is sent to $\hat{B}$ securely.

$\hat{A}$ computes the session-key $K=H_K(K_{\hat{A}},\hat{e}(sQ_A,Q_B))$, $\hat{B}$ computes $K=H_K(K_{\hat{B}},\hat{e}(sQ_B,Q_A))$. Note that $\hat{e}(sQ_A,Q_B)=\hat{e}(sQ_B,Q_A)=\hat{e}(Q_A,Q_B)^s$. $K_{\hat{A}}$ and $K_{\hat{B}}$ can be computed with any of the three versions of YYZ: YYZ, rYYZ and sYYZ, according to the tradeoff among security, privacy and efficiency desired and agreed by the users.

Online Efficient Signcryption

Given a DH-based public-key encryption (PIKE) scheme, e.g., the widely standardized DHIES scheme (by Abdalla, et al, CT-RSA '01, Lecture Notes in Computer Science 2020, pages 143-158, 2001) and the PSEC scheme (by Fujisaki et al, Advances in Cryptology-Proceedings of CRYPTO '99, Lecture Notes in Computer Science 1666, pages 537-554, 1999), where the receiver is $\hat{B}$ of the public-key B and the sender $\hat{A}$ sends X (as a part of the ciphertext) to generate and share the DH-key $B^x$ with $\hat{B}$ (normally $B^x$, together with X, is used to derive a symmetric encryption key and a MAC key). One application of the one-round YYZ, i.e., or YYZ, is to replace the DH-key $B^x$ of the underlying DH-based PIKE scheme by $K_{\hat{A}}=K_{\hat{B}}$ of or YYZ, which yields an online efficient signcryption scheme.

Password-Based TLS/SSL

The Secure Sockets Layer (SSL) protocol (by Freier et al, INTERNET-DRAFT, draft-freier-ssl-version3-02.txt, 1996) is an important and widely deployed authentication protocol, mainly for World Wide Web (WWW). SSL evolves into the de facto standards for Web security until it further evolves into the Transport Layer Security (TLS) (by Dierks et al in Request for Comments (RFC) 2246, Internet Engineering Task Force (IETF), January 1999), which is an Internet standard for Web security developed by the industrial standardization body Internet Engineering Task Force (IETF). The TLS/SSL protocol runs under the application-layer protocols such as Hyper-text Transfer Protocol (HTTP), Lightweight Directory Access Protocol (LDAP), Internet Messaging Access Protocol (IMAP), etc, and above the TCP/IP layers. When the transport-layer communications are secured (ensured by TLS/SSL), communications in all application-layer protocols will be secured in the same manner.

The typical run of TLS/SSL, particularly for e-Banking and e-Commerce over Internet, is in the distributed client-server setting. In this setting, each client $\hat{A}$ pre-registers a password $pw_{\hat{A}} \in D$ at the server $\hat{B}$ who possesses public-key, where D is a low-entropy dictionary. The server maintains a database, where each registered user has an entry that stores the user's identity and password information.

The core authentication mechanism for the typical run of TLS/SSL in the client-server setting is as follows: Suppose $r_A$ and $r_B$ be two random nonces sent by $\hat{A}$ and $\hat{B}$ respectively prior to the following protocol run. In the first-round, $\hat{A}$ sends $\{\hat{A},PKE(r),H(r,\hat{A},r_A,r_B)\}$ to $\hat{B}$, where PKE is the public-key encryption scheme supported by $\hat{B}$, r is a random string and H is a hash function (e.g., SHA-1). In the second-round, $\hat{B}$ decrypts r, and sends back $\{H(r,\hat{B},r_B,r_B)\}$, which authenticates B to A. The session-key is just set to be r. To authenticate $\hat{A}$ to $\hat{B}$, $\hat{A}$ sends back $E_r(pw_{\hat{A}})$ to $\hat{B}$, where E is a symmetric encryption scheme using r as the secret-key.

Suppose the server $\hat{B}$ is of DL public-key $B=g^b$, e.g., the server uses the widely standardized DHIES or PSEC PKE scheme, the inventors present some combinatorial optimization techniques, which make the password-based TLS/SSL both more efficient and more secure in this case. The core of the combinatorial optimization is a password-based (plaintext-aware) public-key encryption scheme that is in turn based on a password-based DHKE for the client-server setting.

Password-based DHKE for the client-server setting: For presentation simplicity, the inventors only describe herein the implementation with embedded subgroup test (the extension to explicit subgroup test is direct). When $\hat{A}$ registers its password $pw_{\hat{A}}$ to $\hat{B}$, $\hat{B}$ computes $B^{tbw}$ and/or $B^{-tbw}$, and stores $\hat{A}$ and $B^{tbw}$ and/or $B^{-tbw}$ at the database entry corresponding to $\hat{A}$, where t is the cofactor, $w=h_l(\hat{A},\hat{B},pw_{\hat{A}})$ or $w=h_l(\hat{A},pw_{\hat{A}})$ or just $w=pw_{\hat{A}}$, $h_l$ denotes the prefix of length l of the output of the hash function h (typically, l is small, e.g., the length of $pw_{\hat{A}}$). Note that even the values $B^{tbw}$ and/or $B^{-tbw}$, pre-computed and stored by the server, are compromised, they do not leak the client's password $pw_{\hat{A}}$. Specifically, the hardness of computing out $B^b$ from $B=g^b$ is equivalent to that of the standard CDH problem. Thus, under the CDH assumption, the possibility of computing out w (and thus $pw_{\hat{A}}$), by the means of computing $B^b$ from the public-key B, is rule out.

$\hat{A}$ sends $\{\hat{A},X'=g^x B^w\}$ to $\hat{B}$. Note that X' is actually a DH-based perfectly-hiding commitment to the value of w. This implies that w can just be set to be the plain password $pw_{\hat{A}}$, but setting $w=h_l(\hat{A},\hat{B},pw_{\hat{A}})$ eases the key derivation and mutual (key confirmation) authentications. (In general, in case of l is small, e.g., the length of password, the inventors suggest still to put players' identities into the inputs of key-derivation and key-confirmation authentication functions for extra security guarantee; but if l is large and w has already committed to players' identities, they can be waived from the inputs of the key-derivation and authentication functions.) The shared DH-secret is computed as follows: $\hat{A}$ computes $K_{\hat{A}}=B^{xt}$. Note all computation of $\hat{A}$ can be off-line, and the computation of $X'=g^x B^w$ essentially accounts for one exponentiation (as w is very small); After receiving the messages from $\hat{A}$, $\hat{B}$ retrieves values $B^{tbw}$ and/or $B^{-tbw}$ from its database, checks that $X' \in G'$, computes $X'^{bt}$ and checks that $X'^{bt} \neq B^{bwt}$ (otherwise, $\hat{B}$ aborts), and finally sets the DH-secret to be $K_{\hat{B}}=X'^{bt}B^{-bwt}$. Note that the on-line computation of $\hat{B}$ is only one exponentiation. It is easy to check that $K_{\hat{A}}=K_{\hat{B}}$, from which the shared secret-keys will be derived.

Password-based (plaintext-aware) PKE: Given a DH-based public-key encryption (PKE) scheme, e.g., the widely standardized DHIES scheme or the PSEC scheme, etc, where the decryptor $\hat{B}$ is of public-key $B=g^b$ and the encryptor $\hat{A}$ sends X (as a part of the ciphertext) to generate and share the DH-key $B^x=X^b$ with $\hat{B}$. Normally, $(X,B^x)$ are in turn used to derive the actual secret, denoted KDF $(X,B^x)$, to be used in the underlying PKE schemes. The inventors present a method to convert such a DH-based PIKE scheme into a password-based (plaintext-aware) PKE scheme, using the above password-based DHKE, as follows:

1) The DH-component X is changed to be $X'=g^x B^x$.
2) The shared DH-secret $B^x=X^b$ is replaced by $K_{\hat{A}}=B^{xt}=X'^{bt}B^{-bwt}=K_{\hat{B}}$ computed as specified above. $(X,B^x=X^b)$ in the input of the key-derivation function KDF are replaced by $(X',B^{xt}=X'^{bt}B^{-bwt})$.
3) Suppose the ciphertext of a message of m of the original DH-based PKE (e.g., the DHIES and PSEC) consists of $C=E_{k_1}(m)$ and $MAC_{k_2}(C)$, the method to add plaintext awareness is to change $MAC_{k_2}(C)$ to be $MAC_{H_K(k_2,m)}(C)$.

The resultant PIKE scheme by the above modifications is denoted by PWPKE. The inventors remark that the above modifications do not weaken the security of the original PKE.

Now, the inventors propose the improved password-based TLS/SSL, with the developed password-based DHKE and PIKE schemes. In the first-round, $\hat{A}$ sends to $\hat{B}$ $\{\hat{A},PWPKE(r)\}$, where r is the random string selected by that will serve as the session-key. Here, the random nonces $(r_A, r_B)$ can be put into the input of the MAC included in the ciphertext of PWPKE(r). Specifically, $MAC_{H_K(k_2,r)}(C)$ is set to be $MAC_{H_K(k_2,r)}(C,\hat{A},r_A,r_B)$. In the second-round, $\hat{B}$ decrypts r, and sends back $MAC_{H_K(k_2,r)}(\hat{B},r_B,r_A)$, The session-key is still set to be r.

The following is a detailed instantiation based on the widely-standardized DHIES scheme (the instantiation based on PSEC scheme can also be derived similarly). In the first-round, $\hat{A}$ sends $\{\hat{A}, X'=g^x B^w, C=E_{k_1}(r), MAC_{H_K(k_2,r)}(C,\hat{A},r_B,r_A)\}$ to $\hat{B}$, where $(k_1,k_2) \leftarrow KDF(X', B^{fx})$. After receiving the messages from $\hat{A}$, $\hat{B}$ does the following: it retrieves $(B^{tbw}, B^{-tbw})$ from its database, checks that $X' \in G'$, computes $X'^{tb}$ and checks that $X'^{tb} \neq B^{bwt}$ (otherwise, $\hat{B}$ aborts), computes $K_{\hat{B}} = X'^{bt}/B^{-bwt}$, and derives the keys $(k_1,k_2) \leftarrow KDF(X', K_{\hat{B}})$; then, $\hat{B}$ decrypts C to get r, and checks the validity of $MAC_{H_K(k_2,r)}(C,\hat{A},r_A,r_B)$ (if not $\hat{B}$ aborts). If all the above checks are successful, $\hat{B}$ computes and returns back $MAC_{H_K(k_2,r)}(\hat{B},r_B,r_A)$ in the second-round.

The inventors remark that all the security of the original password-based TLS/SSL is preserved with the above improved password-based TLS/SSL developed herein (needless to say, the TLS/SSL protocol is not of full-fledged security, e.g., the PFS and KCI vulnerabilities). But, the improved password-based TLS/SSL developed herein enjoys the following remarkable advantages, which make it more attractive and desirable in practice (particularly for e-Banking and e-Commerce over Internet that are the main applications of TLS/SSL):

1) Clients' passwords are well protected at the side of the server, even if the database of the server is compromised.

2) Ruling out offline attacks, even if the session-key is compromised. Specifically, the first-round message perfectly hides $pw_{\hat{A}}$ and the second-round message is independent of $pw_{\hat{A}}$, which rules out any potential off-line attacks. Moreover, the offline attacks are impossible even if the session-key r is compromised. Note that, with the original password-based TLS/SSL, the password can always be derived from $E_r(pw)$ in case the session-key r is compromised. The inventors remark that, as the session-key can be maintained by the client and the server for several hours in practice, it is indeed more susceptible to adversarial exposure (than other ephemeral private values, e.g., the ephemeral DH-exponent x that may be maintained only for several seconds).

3) Improved (communication) efficiency. Specifically, the round complexity is reduced from 3 to 2, and the value $H(r, \hat{A}, r_A, r_B)$ sent in the first-round of the original TLS/SSL is also removed. The computational complexity remains essentially the same as that of the original password-based TLS/SSL.

Wireless Group Diffie-Hellman Key-Exchange for IEEE 802.11

Bresson, et al proposed a very efficient group key-exchange protocol, referred to as the BCEP-protocol (Journal of Computer Communications, vol. 27(127), 1730-1737, 2004), for a group of low-power mobile devices (clients) $\{\hat{A}_1, \ldots, \hat{A}_n\}$, $n \geq 1$, interacting with a wireless gateway (the server or base-station) $\hat{B}$. The BCEP-protocol was aimed for fulfilling the key-exchange mechanism behind the Wired Equivalent Privacy (WEP) protocol that is part of the IEEE 802.11 standard. In the BCEP-protocol, the server $\hat{B}$ is of public-key $B=g^b$, and each client $\hat{A}_i$, $1 \leq i \leq n$, is of public-key $A_i = g^{a_i}$, where $a_i$ is randomly taken by $\hat{A}_i$ from $Z_q^*$. The core key-exchange building block of the BCEP-protocol is as follows: each $\hat{A}_i$ generates $X_i = g^{x_i}$, computes $K_i = B^{x_i}$, generates a signature $\sigma_i$ with its signing-key $a_i$ on $K_i$, and finally sends $(K_i, \sigma_i)$ to $\hat{B}$.

The one-round YYZ (or YYZ) protocol developed in the present invention can be directly applied here to significantly improve the efficiency of the BCEP-protocol. Specifically, the method is to replace $(K_i, \sigma_i)$ by $B^{a_i + e_i x_i} = A_i^b X_i^{e_i b}$ (other components of BCEP can remain unchanged), where $e_i = h(\hat{A}_i, A_i, \hat{B}, B, X_i)$ (variants of the implementation of $e_i$ in the foregoing discussions about YYZ variants are also applicable here). In comparison with the standard DSS-based implementation of the BCEP-protocol, the or YYZ-based implementation has the following remarkable advantages, which are critical for deploying group KE in the stringent wireless setting (of low-power mobile device and centralized base-stations):

1) The computational complexity of each $\hat{A}_i$ is reduced from 3 exponentiations to 2 exponentiations. Note also that all computation of $\hat{A}_i$ can be pre-computed offline.

2) Ignoring the complexity of sub-group test of DH-components (for both the original BCEP-protocol and the or YYZ-based implementation), the computational complexity of $\hat{B}$ can be reduced from $n \times 2.5$ exponentiations to $n \times 1.5$ exponentiations in total. But, if $\hat{B}$ pre-computes and stores $A_i^b$, $1 \leq i = n$, the on-line efficiency of $\hat{B}$ is reduced from $n \times 2.5$ to n. Note that, in the BCEP-protocol, $\hat{B}$ cannot pre-compute $K_i$ and pre-verifies the signature $\sigma_i$, which takes 2.5 exponentiations for each $(K_i, \sigma_i)$, $1 \leq i \leq n$.

3) By waiving signatures, the communication complexity is reduced from $n \times (|p|+2|q|)$ to $n \times |p|$. Note that the length of each $(K_i, \sigma_i)$ is $|p|+2|q|$.

Recall that or YYZ intrinsically suffers from the KCI vulnerability, under the (whether reasonable or not) assumption that the server's static secret-key b is compromised. However, in case B's secret-key b is compromised, all group session-keys of the BCEP-protocol have already been compromised. The inventors remark that, in comparison with the original BCEP-protocol, the or YYZ-based implementation does not incur essential security negatives, but gains significant efficiency advantages (or seemingly much better tradeoff between security and efficiency) in the stringent wireless setting.

Another way to improve the BCEP-protocol is to generate the shared DH-secret $K_i$ by running the password-based DHKE for the client-server setting proposed in the present invention (for improved password TLS/SSL). In this case, the clients do not possess public-keys any longer, but register passwords at the server (which are well-protected even if the server's database is compromised). This solution has the following additional advantages:

(1) The computational complexity of the server is further reduced to only n exponentiations in total.

(2) It should be easier for the server and the clients to maintain and manage passwords (rather than public-keys). In particular, note that clients' passwords are well-protected even if the server's database is compromised.

(3) The KCI vulnerability of YYZ-based solution is also ruled out.

While the invention has been described in terms of various exemplary embodiments, those skilled in the art will recognize that the invention can be practiced with modifications within the spirit and scope of the appended claims.

Further, it is noted that, Applicants' intent is to encompass equivalents of all claim elements, even if amended later during prosecution.

Having thus described our invention, what we claim as new and desire to secure is as follows:

1. A computer-implemented method of proof-of-knowledge and key-exchange between two parties interconnected by a device or a network, said method comprising:

denoting $X_1=A=g^a$ and $X_2=X=g^x$, where A is a fixed Diffie-Hellman component (DH-component) of a first party $\hat{A}$ and is a public key, a is a fixed DH-exponent of said first party $\hat{A}$ and is a secret-key, X is an ephemeral DH-component of said first party $\hat{A}$ and x is an ephemeral DH-exponent of said first party $\hat{A}$;

denoting $Y_1=B=g^b$ and $Y_2=Y=g^y$, where B is a fixed DH-component of a second party $\hat{B}$ and is a public-key, b is a fixed DH-exponent of said second party $\hat{B}$ and is a secret-key, Y is an ephemeral DH-component of said second party $\hat{B}$ and y is an ephemeral DH-exponent of said second party $\hat{B}$, wherein said a,x,b,y are integers such that $1 \leq a,x,b,y \leq q-1$ for some prime number q, g is a generator of a subgroup G of order q of a finite Abelian group G' of order N;

denoting $m_1$ as other arbitrary public information related to a session of said method from said first party $\hat{A}$;

denoting $m_2$ as other arbitrary public information related to a session of said method from said second party $\hat{B}$;

obtaining $\{X_1, X_2, m_1\}$ by said second party $\hat{B}$;

computing, using a computer, $K_{\hat{B}} = K_{\hat{B}}^{(1)} K_{\hat{B}}^{(2)} = A^{(bc_1^{(1)} + yc_2^{(1)}) mod q} X^{(bc_1^{(2)} + yc_2^{(2)}) mod q}$ mod N by said second party $\hat{B}$;

obtaining $\{Y_1, Y_2, m_2\}$ by said first party $\hat{A}$;

computing $K_{\hat{A}} = K_{\hat{A}}^{(1)} K_{\hat{A}}^{(2)} = B^{(ac_1^{(1)} + xc_1^{(2)}) mod q} Y^{(ac_2^{(1)} + xc_2^{(2)}) mod q}$ mod N, wherein said $c_1^{(1)} = t_1 f$, $c_2^{(1)} = t_2 c$, $c_1^{(2)} = t_3 d$, $c_2^{(2)} = t_4 e$, where said $t_i = 1$ or $t_i = N/q$, $1 \leq i \leq 4$, and each one of said c,d,e,f comprises a predetermined mathematical function with a subset of said $\{\hat{A}, A, X, m_1, \hat{B}, B, Y, m_2\}$ being its arguments, wherein $c=h(Y, pub_1)$ or $c=1$, $d=h(X, pub_2)$ or $d=1$, $e=h(X, Y, pub_3)$ or $e=0$, and $f=0$ or $f=1$ or $f=h(pub_4)$, where said h comprises a predetermined function that can be modeled to be a random function in possibly idealized cryptographic models, or one of a cryptographic hash function, a cryptographic pseudorandom function, a cryptographic commitment function, an encryption function and a one-way function, wherein each said $pub_i, 1 \leq i \leq 4$ comprises a subset of messages of said $\{\hat{A}, A, m_1, \hat{B}, B, m_2\}$, and wherein if c=d=1, then $e \neq 1$, wherein $K_{\hat{B}}$ and $K_{\hat{A}}$ are used to derive secrets shared between said first and second parties, said first party $\hat{A}$ derives said secrets by computing $KDF_{\hat{A}}(K_{\hat{A}})$, where $KDF_{\hat{A}}$ comprises a predetermined mathematical function having at least one arguments $K_{\hat{A}}$, said second party $\hat{B}$ derives said secrets by computing $KDF_{\hat{B}}(K_{\hat{B}})$, where said $KDF_{\hat{B}}$ comprises a predetermined mathematical function having at least one arguments $K_{\hat{B}}$.

2. The computer-implemented method of claim 1, wherein implementations of said c,d,e,f include:

(i) $c=h(\hat{A},A,Y)$, $d=h(\hat{B},B,X)$, $e=h(X,Y)$, and $f=0$; or (ii) $c=h(\hat{A},A,Y)$, $d=h(\hat{B},B,X)$, $e=h(X,Y)$ or $e=h(\hat{A},A,\hat{B},B,X,Y)$, $f=1$ or $f=(\hat{A},A,\hat{B},B)$; or (iii) $c=1$, $d=1$, $e=h(\hat{A},A,\hat{B},B,X,Y)$, $f=0$; or (iv) $c=h(\hat{A},A,\hat{B},B,Y)$, $d=h(\hat{B},B,\hat{A},A,X)$, $e=h(\hat{A},A,\hat{B},B,X,Y)$ or $e=h(c,d)$ or $e=h(c,X)$ or $e=h(d,Y)$ or $e=h(X,Y)$, $f=0$ or $f=1$ or $f=(\hat{A},A,\hat{B},B)$; or (v) $c=h(\hat{A},A,Y)$, $d=h(\hat{B},B,X)$, $e=h(\hat{A},A,\hat{B},B,X,Y)$ or $e=h(c,d)$ or $e=h(c,X)$ or $e=h(d,Y)$, $f=0$ or $f=1$ or $f=(\hat{A},A,\hat{B},B)$; or (vi) $c=h(\hat{A},A,Y)$, $d=h(\hat{B},B,X)$, $e=0$, $f=0$; or (vii) $c=1$, $d=h(\hat{A},A,\hat{B},B,X,Y)$, $e=0$, $f=0$; or (viii) $c=h(\hat{A},A,\hat{B},B,Y)$, $d=h(\hat{B},B,\hat{A},A,X)$, $e=0$, $f=0$; or (ix) $c=1$, $d=1$, $e=h(\hat{A},A,\hat{B},B,X,Y)$, $f=1$ or $f=(\hat{A},A,\hat{B},B)$ or $f=(X,Y,\hat{A},A,\hat{B},B)$ or $f=0$; or (x) $c=h(\hat{B},B,Y)$, $d=h(\hat{A},A,X)$, $e=h(X,Y)$ or $e=h(\hat{A},A,\hat{B},B,X,Y)$ or $e=h(c,d)$ or $e=h(c,X)$ or $e=h(d,Y)$, $f=0$ or $f=1$ or $f=(\hat{A},A,\hat{B},B)$; or (xi) $c=h(\hat{A},Y)$, $d=h(\hat{B},X)$, $e=h(X,Y)$ or $e=h(\hat{A},A,\hat{B},B,X,Y)$ or $e=h(c,d)$ or $e=h(c,X)$ or $e=h(d,Y)$, $f=0$ or $f=1$ or $f=(\hat{A},A,\hat{B},B)$; or (xii) $c=h(Y)$, $d=h(X)$, $e=h(X,Y)$ or $e=h(\hat{A},A,\hat{B},B,X,Y)$ or $e=h(c,d)$ or $e=h(c,X)$ or $e=h(d,Y)$, $f=0$ or $f=1$ or $f=(\hat{A},A,\hat{B},B)$.

3. The computer-implemented method of claim 2, wherein said first party $\hat{A}$ holds a certificate $CERT_{\hat{A}}$ issued by a trusted third authority, authentically binding first party's identity and public-key, said certificate $CERT_{\hat{A}}$ includes a value $h_{\hat{A}}$ committing to $(\hat{A},A)$, said $(\hat{A},A)$ as arguments of said functions c,d,e,f are replaced by $h_{\hat{A}}$; and/or said second party $\hat{B}$ holds a certificate $CERT_{\hat{B}}$ issued by a trusted third authority, authentically binding second party's identity and public-key, said certificate $CERT_{\hat{B}}$ includes a value $h_{\hat{B}}$ committing to $(\hat{B},B)$, said $(\hat{B},B)$ as arguments of said functions c,d,e,f are replaced by $h_{\hat{B}}$.

4. The computer-implemented method of claim 3, wherein $h_{\hat{A}} = H(\hat{A},A)$, $h_{\hat{B}} = H(\hat{B},B)$, said H comprises a cryptographic function being one of a cryptographic hash function, a cryptographic pseudorandom function, a cryptographic commitment function, an encryption function and a one-way function.

5. The computer-implemented method of claim 1, wherein $t_1 = t_2 = t_3 = t_4 = 1$, if each party checks and confirms subgroup membership of said subgroup G of said ephemeral DH-component and said fixed DH-component of the other party;

$t_2 = t_3 = t_4 = N/q$, if a party does not explicitly check and confirm subgroup member of said subgroup G of said ephemeral DH-component of the other party, wherein said first party $\hat{A}$ checks and confirms Y is in G' and is not an element of a subgroup in G' of an order being a factor of N/q, said second party $\hat{B}$ checks and confirms X is in G' and is not an element of a subgroup in G' of an order being a factor of N/q; $t_1 = 1$ if each party checks and confirms subgroup membership of said subgroup G of said fixed DH-component of the other party; $t_1 = N/q$ if a party does not check and confirm subgroup membership of said subgroup G of said fixed DH-component of the other party, wherein said first party $\hat{A}$ checks and confirms B is in G' and is not an element of a subgroup in G' of an order being a factor of N/q, said second party $\hat{B}$ checks and confirms A is in G' and is not an element of a subgroup in G' of an order being a factor of N/q.

6. The computer-implemented method of claim 5, wherein said "said first party $\hat{A}$ checks and confirms Y is not an element of a subgroup in G' of an order being a factor of N/q" is performed by checking one of following inequalities: $Y^{(ac_2^{(1)} + yc_2^{(2)}) mod q} \neq 1_G$, $Y^{ac_2^{(1)} mod q} \neq 1_G$, $Y^{yc_2^{(2)} mod q} \neq 1_G$, $K_{\hat{A}} \neq 1_G$, where $1_G$ is identity element of said group G';

said "said second party $\hat{B}$ checks and confirms X is not an element of a subgroup in G' of an order being a factor of N/q" is performed by checking one of following inequalities: $X^{(bc_1^{(2)} + yc_2^{(2)}) mod q} \neq 1_G$, $X^{bc_1^{(2)} mod q} \neq 1_G$, $X^{yc_2^{(2)} mod q} \neq 1_G$, $K_{\hat{B}} \neq 1_G$;

said "said first party $\hat{A}$ checks and confirms B is not an element of a subgroup in G' of an order being a factor of N/q" is performed by checking one of following inequalities: $B^{(ac_1^{(1)} + xc_1^{(2)}) mod q} \neq 1_G$, $B^{ac_1^{(1)} mod q} \neq 1_G$, $B^{xc_1^{(2)} mod q} \neq 1_G$, $K_{\hat{A}} \neq 1_G$;

said "said second party $\hat{B}$ checks and confirms A is not an element of a subgroup in G' of an order being a factor of N/q" is performed by checking one of following inequalities: $A^{(bc_1^{(1)}+yc_2^{(1)})mod q} \neq 1_G$, $A^{bc_1^{(1)} mod q} \neq 1_G$, $A^{yc_2^{(1)} mod q} \neq 1_G$, $K_{\hat{B}} \neq 1_G$.

7. The computer-implemented method of claim 1, wherein a party's public-key is removed from arguments of said functions c,d,e,f, if said trusted third authority party requires the corresponding party to prove possession or knowledge of said secret-key corresponding to said public-key of the corresponding party, and/or the other party already holds an authenticated copy of the public-key prior to the session of said method;

identities of said first party and/or second parties can be removed from arguments of said functions c,d,e,f, if said identities are arguments of said $KDF_{\hat{A}}$ and $KDF_{\hat{B}}$.

8. The computer-implemented method of claim 1, wherein each of $KDE_{\hat{B}}$ and $KDF_{\hat{A}}$ comprises a cryptographic function being one of a cryptographic hash function, a cryptographic pseudorandom function, an encryption function and a one-way function.

9. The computer-implemented method of claim 8, wherein said derived secrets comprise a pair of keys: a MAC-key $K_m$ and a session-key K.

10. The computer-implemented method of claim 1, wherein said second party $\hat{B}$ uses $K_{\hat{B}}$ to generate and send authenticators to said first party $\hat{A}$; and/or said first party $\hat{A}$ uses $K_{\hat{A}}$ to generate and send authenticators to said second party $\hat{B}$;

wherein said first party $\hat{A}$ deems said authenticators from said second party $\hat{B}$ to be valid if said $K_{\hat{A}}$ is determined to be related to said $K_{\hat{B}}$ in a predetermined manner; and/or said second party $\hat{B}$ deems said authenticators from said first party $\hat{A}$ to be valid if said $K_{\hat{B}}$ is determined to be related to said $K_{\hat{A}}$ in a predetermined manner.

11. The computer-implemented method of claim 10, wherein said authenticators from said second party $\hat{B}$ comprise $MAC_{K_m}(m_{\hat{B}})$, where MAC is a predetermined message authentication code function with $K_m$ being as secret-key, and $m_{\hat{B}}$ comprises messages to be authenticated by said second party $\hat{B}$; and/or said authenticators from said first party $\hat{A}$ comprise $MAC_{K_m}(m_{\hat{A}})$, where $m_{\hat{A}}$ comprises messages to be authenticated by said first party $\hat{A}$ and $m_{\hat{A}} \neq m_{\hat{B}}$, said $K_m$ is derived from $K_{\hat{B}}$ (resp. $K_{\hat{A}}$) by $\hat{B}$ (resp. $\hat{A}$) using said $KDF_{\hat{B}}$ (resp. $KDF_{\hat{A}}$).

12. A computer-implemented method of proof-of-knowledge and key-exchange between two parties interconnected by a device or network, said method comprising:

denoting $\{X_1 = B_1(g)^{f_1(x_1)}, \ldots, X_n = B_n(g)^{f_n(x_n)}, m_1\}$, $n \geq 1$, as public component contributions of a first party having identity $\hat{A}$ and working in polynomial-time, where $x_1, \ldots x_n$ are secret values chosen by $\hat{A}$, g is a generator of a subgroup G of order q of a finite Abelian group G' of order N, each $B_i(g)^{f_i(x_i)}$, $1 \leq i \leq n$, comprises a one-way exponentiation function, each $B_i(g), 1 \leq i \leq n$, comprises a predetermined function having at least one argument g, each $f_i(x_i), 1 \leq i \leq n$, comprises a predetermined function having at least one argument $x_i$, $m_1$ includes other arbitrary public information related to a session of said method from said first party $\hat{A}$, for said public component contributions $X_1, \ldots, X_n, m_1$, some of them are fixed values across multiple sessions of said method and some are ephemeral values specific to each session of said method, and said $X_1, \ldots, X_n$ are called Diffie-Hellman components (DH-components) of said first party $\hat{A}$, said $x_1, \ldots, x_n$ are called DH-exponents of said first party $\hat{A}$;

denoting $\{Y_1 = B_1'(g)^{f_1'(y_1)}, \ldots, Y_m = B_m'(g)^{f_m'(y_m)}, m_2\}$, $m \geq 1$, as public component contributions of a second party having identity $\hat{B}$ and working in polynomial time, where $y_1, \ldots, y_m$ are secret values chosen by said second party $\hat{B}$, each $B_j'(g)^{f_j'(y_j)}, 1 \leq j \leq m$, comprises a one-way exponentiation function, each $B_j'(g), 1 \leq j \leq m$, comprises a predetermined function having at least one argument g, each $f_j'(y_j), 1 \leq j \leq m$, comprises a predetermined function having at least one argument $y_j$, $m_2$ includes other arbitrary public information related to a session of said method from said second party $\hat{B}$; for said public component contributions $Y_1, \ldots, Y_m, m_2$, some of them are fixed values across multiple sessions of said method and some are ephemeral values specific to each session of said method, and said $Y_1, \ldots, Y_m$ are called DH-components of said second party $\hat{B}$, said $y_1, \ldots, y_n$ are called DH-exponents of said second party $\hat{B}$;

obtaining $\{X_1, \ldots, X_n, m_1\}$ by said second party $\hat{B}$;

computing, using a computer, $K_{\hat{B}} = F_{\hat{B}}(K_{\hat{B}}^{(1)}, \ldots, K_{\hat{B}}^{(n)}, m_1, m_2)$ by said second party $\hat{B}$, where $K_{\hat{B}}^{(1)} = f_{\hat{B}}^{(1)}(X_1)^{\bar{f}_1'(y_1)c_1^{(1)} + \ldots + \bar{f}_{m'}(y_m)c_m^{(1)}}, \ldots, K_{\hat{B}}^{(n)} = f_{\hat{B}}^{(n)}(X_n)^{\bar{f}_1'(y_1)c_1^{(n)} + \ldots + \bar{f}_{m'}(y_m)c_m^{(n)}}$, each $f_{\hat{B}}^{(i)}(X_i), 1 \leq i \leq n$, comprises a predetermined function having at least one argument $X_i$, each $\bar{f}_j'(y_j), 1 \leq j \leq m$, comprises a predetermined function having at least one argument $y_j$, $F_{\hat{B}}$ comprises a predetermined function having at least n arguments $K_{\hat{B}}^{(1)}, \ldots, K_{\hat{B}}^{(n)}$;

obtaining $\{Y_1, \ldots, Y_m, m_2\}$ by said first party $\hat{A}$;

computing $K_{\hat{A}} = F_{\hat{A}}(K_{\hat{A}}^{(1)}, \ldots, K_{\hat{A}}^{(n)}, m_1, m_2)$ by said first party $\hat{A}$, where $K_{\hat{A}}^{(1)} = f_{\hat{A}}^{(1)}(Y_1)^{\bar{f}_1(x_1)c_m^{(1)}}, \ldots, K_{\hat{A}}^{(n)} = f_{\hat{A}}^{(1)}(Y_1)^{\bar{f}_n(x_n)c_1^{(n)}} \ldots f_{\hat{A}}^{(m)}(Y_m)^{\bar{f}_n(x_n)c_m^{(n)}}$, each $f_{\hat{A}}^{(j)}(Y_j), 1 \leq j \leq m$, comprises a predetermined function having at least one argument $Y_j$, each $\bar{f}_i(x_i), 1 \leq i \leq n$, comprises a predetermined function having at least one argument $x_i$, $F_{\hat{A}}$ comprises a predetermined function having at least n arguments $K_{\hat{A}}^{(1)}, \ldots, K_{\hat{A}}^{(n)}$, wherein each $c_j^{(i)}, 1 \leq i \leq n, 1 \leq j \leq m$, comprises a predetermined function, and non-zero $c_j^{(i)}, 1 \leq i \leq n, 1 \leq j \leq m$ satisfy:

(i) independence requirement: for any $i, 1 \leq i \leq n$, said $\bar{f}_1'(y_1)c_1^{(i)}, \ldots, \bar{f}_m'(y_m)c_m^{(i)}$ when $m \geq 2$ are independent for any ephemeral DH-components of (whether honest or malicious) said second party $\hat{B}$ or said first party $\hat{A}$;

(ii) commitment requirement: said non-zero $c_j^{(i)}, 1 \leq i \leq n, 1 \leq j \leq m$, commit to ephemeral DH-components of both said first party and second party;

(iii) pre-computability and/or post-ID computability and/or deniability: for fixed $X_i, 1 \leq i \leq n$, the value $K_{\hat{B}}^{(i)}$ can be offline pre-computed by $\hat{B}$ and/or for ephemeral $X_i, 1 \leq i \leq n$, the value $K_{\hat{B}}^{(i)}$ can be computed by $\hat{B}$ without knowing said fixed DH-components and identity of $\hat{A}$; for fixed $Y_j, 1 \leq j \leq m$, the values $f_{\hat{A}}^{(j)}(Y_j)^{\bar{f}_1(x_1)c_1^{(j)}}, \ldots, f_{\hat{A}}^{(j)}(Y_j)^{\bar{f}_n(x_n)c_1^{(j)}}$ can be offline pre-computed by $\hat{A}$, and/or for ephemeral $Y_j, 1 \leq j \leq m$, the values $f_{\hat{A}}^{(j)}(Y_j)^{\bar{f}_1(x_1)c_1^{(j)}}, \ldots, f_{\hat{A}}^{(j)}(Y_j)^{\bar{f}_n(x_n)c_1^{(j)}}$ can be computed by $\hat{A}$ without knowing said fixed DH-components and identity of $\hat{B}$; and/or, said values $K_{\hat{A}}$ and $K_{\hat{B}}$ can be computed out merely from said ephemeral DH-exponents and said fixed and ephemeral public DH-components of both said first party and said second party, wherein said public component contributions of said verifier and said prover can be exchanged interactively and adaptively in multiple rounds.

13. The computer-implemented method of claim 12, wherein said non-zero $c_j^{(i)}, 1 \leq i \leq n, 1 \leq j \leq m$ commit to said ephemeral DH-components of both parties and further to identities and/or said fixed DH-components of at least one of first and second parties.

14. The computer-implemented method of claim 12, wherein said non-zero $c_j^{(i)}, 1 \leq i \leq n, 1 \leq j \leq m$, satisfy: for any $j, 1 \leq j \leq m, \mathcal{F}_j'(y_j)\mathcal{F}_1(x_1)c_j^{(1)}, \ldots, \mathcal{F}_j'(y_j)\mathcal{F}(x_n)c_j^{(n)}$ when $n \geq 2$ are independent for any said ephemeral DH-components and said fixed DH-components of said first party $\hat{A}$ or said second party $\hat{B}$.

15. The computer-implemented method of claim 12, wherein $n=1$, $X_1=X=g^x$, where X is an ephemeral DH-component of said party $\hat{A}$ and x is an ephemeral DH-exponent of $\hat{A}$; $m=2$, $Y_1=B=g^b$, $Y_2=Y=g^y$, where B is a fixed DH-component of said party $\hat{B}$ and is a public-key, b is a fixed DH-exponent of $\hat{B}$ and is a secret-key, Y is an ephemeral DH-component of said party $\hat{B}$ and y is an ephemeral DH-exponent of $\hat{B}$; said x,b,y are integers such that $1 \leq x, b, y \leq q-1$ where q is a prime number;

$K_{\hat{B}} = K_{\hat{B}}^{(1)} = X^{(bc_1^{(1)} + yc_2^{(1)}) \bmod q} \bmod N$, $K_{\hat{A}} = K_{\hat{A}}^{(1)} K_{\hat{A}}^{(2)} = B^{xc_1^{(1)} \bmod q} Y^{xc_2^{(1)} \bmod q} \bmod N$, where $c_1^{(1)} = t_1 \mathcal{f}$, said $c_2^{(1)} = t_2 c$, each one of said $\mathcal{f}, c$ comprises a predetermined mathematical function with a subset of said $\{\hat{A}, X, m_1, \hat{B}, B, Y, m_2\}$ being its arguments; said $t_1 = t_2 = 1$ if said party $\hat{B}$ checks and confirms membership of said subgroup G of said X, otherwise said $t_1 = t_2 = N/q$ and said party $\hat{B}$ checks membership of said group G' of said X and checks X is not an element of a subgroup in G' of order being a factor of N/q.

16. The computer-implemented method of claim 15, wherein said "said party $\hat{B}$ checks X is not an element of a subgroup in G' of order being a factor of N/q" is performed by checking $K_{\hat{B}} \neq 1_G$.

17. The computer-implemented method of claim 15, wherein implementations of said functions $\mathcal{f}, c$ include:
(i) $\mathcal{f} = h(\hat{B}, B, X, aux_1)$, $c = h(X, Y, aux_2)$; or
(ii) $\mathcal{f} = 1$, $c = h(X, \hat{B}, B, Y, aux_3)$,
wherein said $aux_i, 1 \leq i \leq 3$, comprises a null message, or said identity $\hat{A}$, or other messages other than $\{X, \hat{B}, B, Y\}$ related to the session of said method.

\* \* \* \* \*